(12) United States Patent
Jin

(10) Patent No.: US 11,467,766 B2
(45) Date of Patent: Oct. 11, 2022

(54) INFORMATION PROCESSING METHOD, APPARATUS, DEVICE, AND SYSTEM

(71) Applicant: HUAWEI TECHNOLOGIES CO., LTD., Guangdong (CN)

(72) Inventor: Long Jin, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/162,232

(22) Filed: Jan. 29, 2021

(65) Prior Publication Data
US 2021/0149588 A1    May 20, 2021

Related U.S. Application Data

(63) Continuation of application No. PCT/CN2018/098040, filed on Aug. 1, 2018.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| 2015/0032913 | A1 | 1/2015 | Kim et al. |
| 2016/0011790 | A1* | 1/2016 | Rostoker ............. G06F 12/0862 |
| | | | 711/103 |
| 2017/0192902 | A1 | 7/2017 | Hwang et al. |
| 2017/0300422 | A1 | 10/2017 | Szubbocsev |

FOREIGN PATENT DOCUMENTS

| CN | 105159622 A | 12/2015 |
| CN | 106775466 A | 5/2017 |
| CN | 108062280 A | 5/2018 |

* cited by examiner

Primary Examiner — Kevin Verbrugge
(74) Attorney, Agent, or Firm — Womble Bond Dickinson (US) LLP

(57) ABSTRACT

This application provides an information processing method, an apparatus, a device, and a system. The information processing method includes: A host chip determines first information, where the first information includes a first logical address set. The host chip generates first indication information, where the first indication information includes the first logical address set and a first physical address set that is determined based on a mapping relationship between a logical address and a physical address and that corresponds to the first logical address set, the first physical address set includes N physical addresses, the N physical addresses are in a one-to-one correspondence with N logical addresses included in the first logical address set, and N is an integer greater than or equal to 2. The host chip sends a first request to a storage chip connected to the host chip, where the first request includes the first indication information.

14 Claims, 10 Drawing Sheets

| 0 xx00 0001b | 1 Label | 2 LU-N | 3 Task label |
|---|---|---|---|
| 4 IID / Command setting type | 5 Granularity | 6 Reserved | 7 Reserved |
| 8 Quantity | 9 Reserved | 10 (MSB) Data segment length | 11 (LSB) (0000h) |
| 12 (MSB) | 13 | 14 | 15 (LSB) |
| | Expected data transmission length | | |
| 16 CDB[0] | 17 CDB[1] | 18 CDB[2] | 19 CDB[3] |
| 20 CDB[4] | 21 CDB[5] | 22 CDB[6] | 23 CDB[7] |
| 24 CDB[8] | 25 CDB[9] | 26 CDB[10] | 27 CDB[11] |
| 28 CDB[12] | 29 CDB[13] | 30 CDB[14] | 31 CDB[15] |
| Error header information (omit if HD=0) | | | |
| 32 Logical address 0 (four bytes) Physical address 0 (four bytes) ... Logical address N (four bytes) Physical address N (four bytes) | | | |

FIG. 9a

| 0 xx10 0001b | 1 Label | 2 LU-N | 3 Task label |
|---|---|---|---|
| 4 IID / Command setting type | 5 Granularity | 6 Response | 7 Status |
| 8 Quantity | 9 Device information | 10 (MSB) Data segment length | 11 (LSB) |
| 12 (MSB) | 13 | 14 | 15 (LSB) |
| | Remaining transmissions | | |
| 16 | 17 | 18 Reserved | 19 |
| 20 | 21 | 22 Reserved | 23 |
| 24 | 25 | 26 Reserved | 27 |
| 28 | 29 | 30 Reserved | 31 |
| Error header information (omit if HD=0) | | | |

32 Logical address 0 (four bytes)
Physical address 0 (four bytes)
...
Logical address M (four bytes)
Physical address M (four bytes)

FIG. 9b

INFORMATION PROCESSING METHOD, APPARATUS, DEVICE, AND SYSTEM

CROSS-REFERENCE TO RELATED APPLICATIONS

This application is a continuation of International Application No. PCT/CN2018/098040, filed on Aug. 1, 2018, the disclosure of which is hereby incorporated by reference in its entirety.

TECHNICAL FIELD

This application relates to the field of chip technologies, and in particular, to an information processing method, an apparatus, a device, and a system.

BACKGROUND

A storage chip usually includes a controller and a cache (flash) array. A static random access memory (SRAM) in the controller may be configured to store a mapping relationship between a logical address and a physical address, which is also referred to as a table of mapping between a logical address and a physical address.

For example, when a terminal device needs to send a request to the storage chip, a universal flash storage (UFS) integrated on a system-on-a-chip (SOC) side may send a request that conforms to a UFS protocol information unit (UPIU). Then, after receiving the request, the storage chip searches the SRAM for the table of mapping between a logical address and a physical address, so as to operate the flash array to implement an operation that needs to be performed by using the request. The request may include a read request, a write request, an erase request, or the like.

However, during actual application, SRAM resources are limited, and a full mapping table usually cannot be stored. Therefore, a table of mapping between a logical address and a physical address possibly cannot be found during each-time search, and a process such as multi-level search is required. For example, when a read request is executed to search for a table of mapping between a logical address and a physical address, if the table of mapping between a logical address and a physical address is not found, the table needs to be downloaded from a flash to an SRAM. In addition, if an entry in the SRAM has no sufficient empty space, another entry is flushed to the flash, and consequently such a low hit ratio causes table importing overheads and an operation such as entry flushing, severely affecting a response speed of the read request.

Therefore, how to increase a response speed of a read request is an urgent problem to be resolved.

SUMMARY

This application discloses an information processing method, an apparatus, a device, and a system, to effectively increase a response speed of a read request.

According to a first aspect, an embodiment of this application provides an information processing method. The method is applied to a host chip connected to a universal flash storage UFS protocol information unit UPIU, and the method includes:

The host chip determines a first logical address set. The host chip generates first indication information. The host chip sends a first request to a storage chip connected to the host chip. The first indication information includes the first logical address set and a first physical address set that is determined based on a mapping relationship between a logical address and a physical address and that corresponds to the first logical address set, the first physical address set includes N physical addresses, the N physical addresses are in a one-to-one correspondence with N logical addresses included in the first logical address set, and N is an integer greater than or equal to 2. The first request includes the first indication information.

In this embodiment of this application, the mapping relationship between a logical address and a physical address is stored in the host chip with relatively large space, so that a response speed of a read request can be effectively increased. In addition, the first indication information is generated, the first indication information may be used to indicate the first physical address set, and the first physical address set includes at least two physical addresses. For example, when one physical address corresponds to a 4 KB read request, 8 KB, 16 KB, or even 32 KB read request can be implemented by implementing this embodiment of this application. Therefore, efficiency of real-time information exchange between the host chip and the storage chip is effectively implemented.

In this embodiment of this application, the N logical addresses and the N physical addresses that have a mapping relationship are indicated to the storage chip, so that a case in which the storage chip cannot determine corresponding data (first data) based only on a physical address because the mapping relationship between a logical address and a physical address that is stored in the storage chip changes can be avoided, thereby further improving efficiency of information exchange between the host chip and the storage chip.

In one embodiment, the logical address may include a logical block address (LBA), and the physical address may include a physical page number (PPN).

In one embodiment, the first request further includes first control information, the first control information includes a first field, and the first field is used to indicate N.

In this embodiment of this application, a quantity of physical addresses in the first physical address set is indicated to the storage chip, so that the storage chip can clearly learn of the quantity of physical addresses included in the first physical address set, to obtain data, thereby further improving information exchange efficiency.

In one embodiment, the first control information further includes a second field; and the second field is used to indicate an access granularity of each physical address in the first physical address set; or the second field is used to indicate an access granularity of each logical address in the first logical address set; or the second field is used to indicate a sum of an access granularity of each physical address in the first physical address set and an access granularity of each logical address in the first logical address set, where the access granularity of each physical address in the first physical address set is the same as the access granularity of each logical address in the first logical address set.

In this embodiment of this application, when the host chip and the storage chip pre-agree on no access granularity, the host chip indicates an access granularity to the storage chip, so that the storage chip can obtain a specific quantity of bytes of each physical address in the first physical address set.

In one embodiment, before the host chip sends the first request to the storage chip connected to the host chip, the method further includes: The host chip allocates an extension header field EHS extended domain, where the EHS extended domain is used to carry the first indication information.

Specifically, the host chip may include a UFS driver and a UFS controller, and the UFS driver is connected to the UFS controller. Before the host chip sends the first request to the storage chip connected to the host chip, the method further includes: The UFS driver allocates an extension header field EHS extended domain. The UFS driver sends the EHS extended domain to the UFS controller. The EHS extended domain is used to carry the first indication information.

In this embodiment of this application, the extension header field (EHS) extended domain may include at least 2016B space, and the EHS extended domain may be used to carry a UPIU request (command UPIU), that is, the first indication information in the first request. Specifically, by using the EHS extended domain, the first indication information sent by the host chip to the storage chip may include the N physical addresses, so as to avoid low information exchange efficiency caused by sending one physical address each time. Therefore, by implementing this embodiment of this application, efficiency of information exchange between the host chip and the storage chip is effectively improved by using the EHS extended domain.

In one embodiment, the first control information is carried in a first reserved field in a UPIU protocol frame.

In one embodiment, the method further includes: The host chip receives a first response message from the storage chip, where the first response message includes second indication information, the second indication information includes the first logical address set and a second physical address set, the second physical address set is a physical address set that corresponds to the first logical address set after the mapping relationship between a logical address and a physical address is updated, the second physical address set includes N physical addresses, and the N physical addresses are in a one-to-one correspondence with the N logical addresses.

In this embodiment of this application, after the mapping relationship between a logical address and a physical address changes, the host chip receives the first response message that is sent by the storage chip and that includes the first logical address set and the second physical address set that have a mapping relationship, so that the host chip can update, in time, the mapping relationship between a logical address and a physical address that is stored in the host chip, thereby effectively improving efficiency of searching for a physical address by the host chip based on a logical address.

In one embodiment, the first response message further includes second control information, the second control information includes a third field, and the third field is used to indicate N.

In one embodiment, the second control information further includes a fourth field; and the fourth field is used to indicate an access granularity of each physical address in the second physical address set; or the fourth field is used to indicate an access granularity of each logical address in the first logical address set; or the fourth field is used to indicate a sum of an access granularity of each physical address in the second physical address set and an access granularity of each logical address in the first logical address set, where the access granularity of each physical address in the second physical address set is the same as the access granularity of each logical address in the first logical address set.

In one embodiment, the second indication information is carried in the EHS extended domain.

In one embodiment, the second control information is carried in a second reserved field in the UPIU protocol frame.

According to a second aspect, an embodiment of this application further provides an information processing method. The method is applied to a storage chip connected to a universal flash storage UFS protocol information unit UPIU, and the method includes:

The storage chip receives a first request from a host chip connected to the storage chip. The storage chip obtains first data based on a first physical address set. The storage chip sends the first data to the host chip. The first request includes first indication information, the first indication information includes a first logical address set and the first physical address set that is determined based on a mapping relationship between a logical address and a physical address and that corresponds to the first logical address set, the first physical address set includes N physical addresses, the N physical addresses are in a one-to-one correspondence with N logical addresses included in the first logical address set, and N is an integer greater than or equal to 2. The first data includes data stored in the first physical address set.

In one embodiment, the first request further includes first control information, the first control information includes a first field, and the first field is used to indicate N.

In one embodiment, the first control information further includes a second field; and the second field is used to indicate an access granularity of each physical address in the first physical address set; or the second field is used to indicate an access granularity of each logical address in the first logical address set; or the second field is used to indicate a sum of an access granularity of each physical address in the first physical address set and an access granularity of each logical address in the first logical address set, where the access granularity of each physical address in the first physical address set is the same as the access granularity of each logical address in the first logical address set.

In one embodiment, the first indication information is carried in an extension header field EHS extended domain, and the EHS extended domain is allocated by the host chip.

In one embodiment, the first control information is carried in a first reserved field in a UPIU protocol frame.

In one embodiment, after the storage chip receives the first request from the host chip connected to the storage chip, the method further includes: When determining that the mapping relationship between a logical address and a physical address changes, the storage chip sends a first response message to the host chip. The first response message includes second indication information, the second indication information includes the first logical address set and a second physical address set, the second physical address set is a physical address set that corresponds to the first logical address set after the mapping relationship between a logical address and a physical address changes, the second physical address set includes N physical addresses, and the N physical addresses are in a one-to-one correspondence with the N logical addresses.

In one embodiment, the first response message further includes second control information, the second control information includes a third field, and the third field is used to indicate N.

In one embodiment, the second control information further includes a fourth field; and the fourth field is used to indicate an access granularity of each physical address in the second physical address set; or the fourth field is used to indicate an access granularity of each logical address in the first logical address set; or the fourth field is used to indicate a sum of an access granularity of each physical address in the second physical address set and an access granularity of each logical address in the first logical address set, where the access granularity of each physical address in the second physical address set is the same as the access granularity of each logical address in the first logical address set.

In one embodiment, the second indication information is carried in the EHS extended domain.

In one embodiment, the second control information is carried in a second reserved field in the UPIU protocol frame.

According to a third aspect, an embodiment of this application further provides an information processing method. The method is applied to a storage chip connected to a universal flash storage UFS protocol information unit UPIU, and the method includes:

The storage chip receives a second request from a host chip connected to the storage chip. After writing second data into the storage chip, the storage chip generates third indication information based on a changed mapping relationship between a logical address and a physical address. The storage chip sends a second response message for the second request to the host chip. The second request includes a second logical address set and the second data, and the second data includes data to be written into the storage chip. The third indication information includes the second logical address set and a third physical address set corresponding to the second logical address set, the third physical address set includes M physical addresses, the M physical addresses are in a one-to-one correspondence with M logical addresses included in the second logical address set, the third physical address set is used to store the second data, and M is an integer greater than or equal to 3. The second response message includes the third indication information, and the second response message is used to indicate to update the mapping relationship between a logical address and a physical address in the host chip.

In this embodiment of this application, the storage chip indicates at least three physical addresses to the host chip, so that when a large quantity of mapping relationships are updated in the storage chip, the host chip can be indicated in time to update the mapping relationship stored in the host chip, thereby improving efficiency of updating the mapping relationship, and improving real-time information exchange efficiency.

In one embodiment, the second response message further includes third control information, the third control information includes a fifth field, and the fifth field is used to indicate M.

In one embodiment, the third control information further includes a sixth field; and the sixth field is used to indicate an access granularity of each physical address in the third physical address set; or the sixth field is used to indicate an access granularity of each logical address in the second logical address set; or the sixth field is used to indicate a sum of an access granularity of each physical address in the third physical address set and an access granularity of each logical address in the second logical address set, where the access granularity of each physical address in the third physical address set is the same as the access granularity of each logical address in the second logical address set.

In one embodiment, the third indication information is carried in an extension header field EHS extended domain, and the EHS extended domain is allocated by the host chip.

In one embodiment, the third control information is carried in a third reserved field in a UPIU protocol frame.

According to a fourth aspect, an embodiment of this application further provides an information processing method. The method is applied to a host chip connected to a universal flash storage UFS protocol information unit UPIU, and the method includes:

The host chip receives a second response message from a storage chip connected to the host chip. The host chip updates a mapping relationship between a logical address and a physical address in the host chip based on a third indication information. The second response message includes the third indication information, the third indication information includes a second logical address set and a third physical address set corresponding to the second logical address set, the third physical address set includes M physical addresses, the M physical addresses are in a one-to-one correspondence with M logical addresses included in the second logical address set, the third physical address set is used to store the second data, and M is an integer greater than or equal to 3.

In one embodiment, the second response message further includes third control information, the third control information includes a fifth field, and the fifth field is used to indicate M.

In one embodiment, the third control information further includes a sixth field; and the sixth field is used to indicate an access granularity of each physical address in the third physical address set; or the sixth field is used to indicate an access granularity of each logical address in the second logical address set; or the sixth field is used to indicate a sum of an access granularity of each physical address in the third physical address set and an access granularity of each logical address in the second logical address set, where the access granularity of each physical address in the third physical address set is the same as the access granularity of each logical address in the second logical address set.

In one embodiment, the third indication information is carried in an extension header field EHS extended domain, and the EHS extended domain is allocated by the host chip.

In one embodiment, the third control information is carried in a third reserved field in a UPIU protocol frame.

In one embodiment, before the host chip receives the second response message from the storage chip connected to the host chip, the method further includes: The host chip sends a second request to the storage chip, where the second request includes the second logical address set and the second data, and the second data includes data to be written into the storage chip.

According to a fifth aspect, an embodiment of this application further provides an information processing method. The method is applied to a host chip connected to a universal flash storage UFS protocol information unit UPIU, and the method includes:

The host chip determines a first logical address set. The host chip generates first indication information. The host chip sends a first request to a storage chip connected to the host chip. The first indication information includes the first logical address set and a first physical address set that is determined based on a mapping relationship between a logical address and a physical address and that corresponds to the first logical address set, the first physical address set includes N physical addresses, the N physical addresses are in a one-to-one correspondence with N logical addresses included in the first logical address set, and N is an integer greater than or equal to 2. The first request includes the first indication information.

In one embodiment, the first request further includes first control information, the first control information includes a first field, and the first field is used to indicate N.

In one embodiment, the first control information further includes a second field; and the second field is used to indicate an access granularity of each physical address in the first physical address set; or the second field is used to indicate an access granularity of each logical address in the first logical address set; or the second field is used to indicate a sum of an access granularity of each physical address in the first physical address set and an access granularity of each logical address in the first logical address set, where the access granularity of each physical address in the first physical address set is the same as the access granularity of each logical address in the first logical address set.

In one embodiment, the first request includes a read request.

In one embodiment, after the host chip sends the first request to the storage chip connected to the host chip, the method further includes: The host chip receives a first response message from the storage chip, where the first response message includes second indication information, the second indication information includes the first logical address set and a second physical address set, the second physical address set is a physical address set that corresponds to the first logical address set after the mapping relationship between a logical address and a physical address is updated, the second physical address set includes N physical addresses, and the N physical addresses are in a one-to-one correspondence with the N logical addresses.

In one embodiment, the first response message further includes second control information, the second control information includes a third field, and the third field is used to indicate N.

In one embodiment, the second control information further includes a fourth field; and the fourth field is used to indicate an access granularity of each physical address in the second physical address set; or the fourth field is used to indicate an access granularity of each logical address in the first logical address set; or the fourth field is used to indicate a sum of an access granularity of each physical address in the second physical address set and an access granularity of each logical address in the first logical address set, where the access granularity of each physical address in the second physical address set is the same as the access granularity of each logical address in the first logical address set.

In one embodiment, the method further includes: The host chip sends a second request to the storage chip. The host chip receives a second response message from the storage chip. The host chip updates the mapping relationship between a logical address and a physical address in the host chip based on third indication information. The second request includes a second logical address set and second data, and the second data includes data to be written into the storage chip. The second response message includes the third indication information, the third indication information includes the second logical address set and a third physical address set corresponding to the second logical address set, the third physical address set includes M physical addresses, the M physical addresses are in a one-to-one correspondence with M logical addresses included in the second logical address set, the third physical address set is used to store the second data, and M is an integer greater than or equal to 3.

In one embodiment, the second response message further includes third control information, the third control information includes a fifth field, and the fifth field is used to indicate M.

In one embodiment, the third control information further includes a sixth field; and the sixth field is used to indicate an access granularity of each physical address in the third physical address set; or the sixth field is used to indicate an access granularity of each logical address in the second logical address set; or the sixth field is used to indicate a sum of an access granularity of each physical address in the third physical address set and an access granularity of each logical address in the second logical address set, where the access granularity of each physical address in the third physical address set is the same as the access granularity of each logical address in the second logical address set.

In one embodiment, the second request includes a write request.

In one embodiment, before the host chip sends the first request to the storage chip connected to the host chip, the method further includes: The host chip allocates an extension header field EHS extended domain, where the EHS extended domain is used to carry the first indication information.

In one embodiment, the EHS extended domain is further used to carry the second indication information.

In one embodiment, the first control information is carried in a first reserved field in a UPIU protocol frame.

In one embodiment, the second control information is carried in a second reserved field in the UPIU protocol frame.

Specifically, the host chip includes a UFS driver and a UFS controller, and the UFS driver is connected to the UFS controller. Before the host chip sends the first request to the storage chip connected to the host chip, the method further includes: The UFS driver allocates an extension header field EHS extended domain. The UFS driver sends the EHS extended domain to the UFS controller.

According to a sixth aspect, an embodiment of this application further provides an information processing method. The method is applied to a storage chip connected to a universal flash storage UFS protocol information unit UPIU, and the method includes:

The storage chip receives a first request from a host chip connected to the storage chip. The storage chip obtains first data based on a first physical address set. The storage chip sends the first data to the host chip. The first request includes first indication information, the first indication information includes a first logical address set and a first physical address set that is determined based on a mapping relationship between a logical address and a physical address and that corresponds to the first logical address set, the first physical address set includes N physical addresses, the N physical addresses are in a one-to-one correspondence with N logical addresses included in the first logical address set, and N is an integer greater than or equal to 2. The first data includes data stored in the first physical address set.

In one embodiment, the first request further includes first control information, the first control information includes a first field, and the first field is used to indicate N.

In one embodiment, the first control information further includes a second field; and the second field is used to indicate an access granularity of each physical address in the first physical address set; or the second field is used to indicate an access granularity of each logical address in the first logical address set; or the second field is used to indicate a sum of an access granularity of each physical address in the first physical address set and an access granularity of each logical address in the first logical address set, where the access granularity of each physical address in the first physical address set is the same as the access granularity of each logical address in the first logical address set.

In one embodiment, the first indication information is carried in an extension header field EHS extended domain, and the EHS extended domain is allocated by the host chip.

In one embodiment, the first control information is carried in a first reserved field in a UPIU protocol frame.

In one embodiment, the first request includes a read request.

In one embodiment, after the storage chip receives the first request from the host chip connected to the storage chip, the method further includes: When determining that the mapping relationship between a logical address and a physical address changes, the storage chip sends a first response message to the host chip. The first response message includes second indication information, the second indication information includes the first logical address set and a second physical address set, the second physical address set is a physical address set that corresponds to the first logical address set after the mapping relationship between a logical address and a physical address changes, the second physical address set includes N physical addresses, and the N physical addresses are in a one-to-one correspondence with the N logical addresses.

In one embodiment, the first response message further includes second control information, the second control information includes a third field, and the third field is used to indicate N.

In one embodiment, the second control information further includes a fourth field; and the fourth field is used to indicate an access granularity of each physical address in the second physical address set; or the fourth field is used to indicate an access granularity of each logical address in the first logical address set; or the fourth field is used to indicate a sum of an access granularity of each physical address in the second physical address set and an access granularity of each logical address in the first logical address set, where the access granularity of each physical address in the second physical address set is the same as the access granularity of each logical address in the first logical address set.

In one embodiment, the method further includes: The storage chip receives a second request from the host chip connected to the storage chip. After writing second data into the storage chip, the storage chip generates third indication information based on a changed mapping relationship between a logical address and a physical address. The storage chip sends a second response message for the second request to the host chip.

The second request includes a second logical address set and the second data, and the second data includes data to be written into the storage chip. The third indication information includes the second logical address set and a third physical address set corresponding to the second logical address set, the third physical address set includes M physical addresses, the M physical addresses are in a one-to-one correspondence with M logical addresses included in the second logical address set, the third physical address set is used to store the second data, and M is an integer greater than or equal to 3. The second response message includes the third indication information, and the second response message is used to indicate to update the mapping relationship between a logical address and a physical address in the host chip.

In one embodiment, the second response message further includes third control information, the third control information includes a fifth field, and the fifth field is used to indicate M.

In one embodiment, the third control information further includes a sixth field; and the sixth field is used to indicate an access granularity of each physical address in the third physical address set; or the sixth field is used to indicate an access granularity of each logical address in the second logical address set; or the sixth field is used to indicate a sum of an access granularity of each physical address in the third physical address set and an access granularity of each logical address in the second logical address set, where the access granularity of each physical address in the third physical address set is the same as the access granularity of each logical address in the second logical address set.

In one embodiment, the second request includes a write request.

In one embodiment, the third indication information is carried in the EHS extended domain, and the EHS extended domain is allocated by the host chip.

In one embodiment, the third control information is carried in a third reserved field in the UPIU protocol frame.

According to a seventh aspect, an embodiment of this application provides a host chip, which may be configured to perform the method in the first aspect. The host chip is connected to a universal flash storage UFS protocol information unit UPIU, and the host chip includes:

a determining unit, configured to determine a first logical address set; a generation unit, configured to generate first indication information, where the first indication information includes the first logical address set and a first physical address set that is determined based on a mapping relationship between a logical address and a physical address and that corresponds to the first logical address set, the first physical address set includes N physical addresses, the N physical addresses are in a one-to-one correspondence with N logical addresses included in the first logical address set, and N is an integer greater than or equal to 2; and a sending unit, configured to send a first request to a storage chip connected to the host chip, where the first request includes the first indication information.

In one embodiment, the first indication information further includes a mapping relationship between the N logical addresses and the N physical addresses, and one logical address corresponds to one physical address.

In one embodiment, the first request further includes first control information, the first control information includes a first field, and the first field is used to indicate N.

In one embodiment, the first control information further includes a second field; and the second field is used to indicate an access granularity of each physical address in the first physical address set; or the second field is used to indicate an access granularity of each logical address in the first logical address set; or the second field is used to indicate a sum of an access granularity of each physical address in the first physical address set and an access granularity of each logical address in the first logical address set, where the access granularity of each physical address in the first physical address set is the same as the access granularity of each logical address in the first logical address set.

In one embodiment, the host chip further includes an allocation unit, configured to allocate an extension header field EHS extended domain, where the EHS extended domain is used to carry the first indication information.

In one embodiment, the first control information is carried in a first reserved field in a UPIU protocol frame.

In one embodiment, the host chip further includes a receiving unit, configured to receive a first response message from the storage chip, where the first response message includes second indication information, the second indication information includes the first logical address set and a second physical address set, the second physical address set is a physical address set that corresponds to the first logical address set and that is obtained after the mapping relationship between a logical address and a physical address is updated, the second physical address set includes N physical addresses, and the N physical addresses are in a one-to-one correspondence with the N logical addresses.

In one embodiment, the first response message further includes second control information, the second control information includes a third field, and the third field is used to indicate N.

In one embodiment, the second control information further includes a fourth field; and the fourth field is used to indicate an access granularity of each physical address in the second physical address set; or the fourth field is used to indicate an access granularity of each logical address in the first logical address set; or the fourth field is used to indicate a sum of an access granularity of each physical address in the second physical address set and an access granularity of each logical address in the first logical address set, where the access granularity of each physical address in the second physical address set is the same as the access granularity of each logical address in the first logical address set.

In one embodiment, the second indication information is carried in the EHS extended domain.

In one embodiment, the second control information is carried in a second reserved field in the UPIU protocol frame.

According to an eighth aspect, an embodiment of this application provides a storage chip, which may be configured to perform the implementations of the second aspect. The storage chip is connected to a universal flash storage UFS protocol information unit UPIU, and the storage chip includes: a receiving unit, configured to receive a first request from a host chip connected to the storage chip, where the first request includes first indication information, the first indication information includes a first logical address set and a first physical address set that is determined based on a mapping relationship between a logical address and a physical address and that corresponds to the first logical address set, the first physical address set includes N physical addresses, the N physical addresses are in a one-to-one correspondence with N logical addresses included in the first logical address set, and N is an integer greater than or equal to 2; an obtaining unit, configured to obtain first data based on the first physical address set, where the first data includes data stored in the first physical address set; and a sending unit, configured to send the first data to the host chip.

In one embodiment, the first request further includes first control information, the first control information includes a first field, and the first field is used to indicate N.

In one embodiment, the first control information further includes a second field; and the second field is used to indicate an access granularity of each physical address in the first physical address set; or the second field is used to indicate an access granularity of each logical address in the first logical address set; or the second field is used to indicate a sum of an access granularity of each physical address in the first physical address set and an access granularity of each logical address in the first logical address set, where the access granularity of each physical address in the first physical address set is the same as the access granularity of each logical address in the first logical address set.

In one embodiment, the first request is carried in an extension header field EHS extended domain, and the EHS extended domain is allocated by the host chip.

In one embodiment, the first control information is carried in a first reserved field in a UPIU protocol frame.

In one embodiment, the sending unit is further configured to: when it is determined that the mapping relationship between a logical address and a physical address changes, send a first response message to the host chip. The first response message includes second indication information, the second indication information includes the first logical address set and a second physical address set, the second physical address set is a physical address set that corresponds to the first logical address set after the mapping relationship between a logical address and a physical address changes, the second physical address set includes N physical addresses, and the N physical addresses are in a one-to-one correspondence with the N logical addresses.

In one embodiment, the first response message further includes second control information, the second control information includes a third field, and the third field is used to indicate N.

In one embodiment, the second control information further includes a fourth field; and the fourth field is used to indicate an access granularity of each physical address in the second physical address set; or the fourth field is used to indicate an access granularity of each logical address in the first logical address set; or the fourth field is used to indicate a sum of an access granularity of each physical address in the second physical address set and an access granularity of each logical address in the first logical address set, where the access granularity of each physical address in the second physical address set is the same as the access granularity of each logical address in the first logical address set.

In one embodiment, the second indication information is carried in the EHS extended domain.

In one embodiment, the second control information is carried in a second reserved field in the UPIU protocol frame.

According to a ninth aspect, an embodiment of this application further provides a storage chip, which is configured to perform the implementations of the third aspect. The storage chip is connected to a universal flash storage UFS protocol information unit UPIU, and the storage chip includes:

a receiving unit, configured to receive a second request from a host chip connected to the storage chip, where the second request includes a second logical address set and second data, and the second data includes data to be written into the storage chip; a generation unit, configured to: after the second data is written into the storage chip, generate third indication information based on a changed mapping relationship between a logical address and a physical address, where the third indication information includes the second logical address set and a third physical address set corresponding to the second logical address set, the third physical address set includes M physical addresses, the M physical addresses are in a one-to-one correspondence with M logical addresses included in the second logical address set, the third physical address set is used to store the second data, and M is an integer greater than or equal to 3; and a sending unit, configured to send a second response message for the second request to the host chip, where the second response message includes the third indication information, and the second response message is used to indicate to update the mapping relationship between a logical address and a physical address in the host chip.

In one embodiment, the second response message further includes third control information, the third control information includes a fifth field, and the fifth field is used to indicate M.

In one embodiment, the third control information further includes a sixth field; and the sixth field is used to indicate an access granularity of each physical address in the third physical address set; or the sixth field is used to indicate an access granularity of each logical address in the second logical address set; or the sixth field is used to indicate a sum of an access granularity of each physical address in the third physical address set and an access granularity of each logical address in the second logical address set, where the access granularity of each physical address in the third physical address set is the same as the access granularity of each logical address in the second logical address set.

In one embodiment, the third indication information is carried in an extension header field EHS extended domain, and the EHS extended domain is allocated by the host chip.

In one embodiment, the third control information is carried in a third reserved field in a UPIU protocol frame.

According to a tenth aspect, an embodiment of this application provides a host chip, which is configured to perform the implementations of the fourth aspect. The host chip is connected to a universal flash storage UFS protocol information unit UPIU, and the host chip includes:

a receiving unit, configured to receive a second response message from a storage chip connected to the host chip, where the second response message includes third indication information, the third indication information includes a second logical address set and a third physical address set corresponding to the second logical address set, the third physical address set includes M physical addresses, the M physical addresses are in a one-to-one correspondence with M logical addresses included in the second logical address set, the third physical address set is used to store the second data, and M is an integer greater than or equal to 3; and an updating unit, configured to update a mapping relationship between a logical address and a physical address in the host chip based on the third indication information.

In one embodiment, the second response message further includes third control information, the third control information includes a fifth field, and the fifth field is used to indicate M.

In one embodiment, the third control information further includes a sixth field; and the sixth field is used to indicate an access granularity of each physical address in the third physical address set; or the sixth field is used to indicate an access granularity of each logical address in the second logical address set; or the sixth field is used to indicate a sum of an access granularity of each physical address in the third physical address set and an access granularity of each logical address in the second logical address set, where the access granularity of each physical address in the third physical address set is the same as the access granularity of each logical address in the second logical address set.

In one embodiment, the third indication information is carried in an extension header field EHS extended domain, and the EHS extended domain is allocated by the host chip.

In one embodiment, the third control information is carried in a third reserved field in a UPIU protocol frame.

In one embodiment, the host chip further includes a sending unit, configured to send a second request to the storage chip, where the second request includes the second logical address set and the second data, and the second data includes data to be written into the storage chip.

According to an eleventh aspect, an embodiment of this application further provides a host chip, which is configured to perform the implementations of the fifth aspect. The host chip is connected to a universal flash storage UFS protocol information unit UPIU, and the host chip includes:

a determining unit, configured to determine a first logical address set; a generation unit, configured to generate first indication information, where the first indication information includes the first logical address set and a first physical address set that is determined based on a mapping relationship between a logical address and a physical address and that corresponds to the first logical address set, the first physical address set includes N physical addresses, the N physical addresses are in a one-to-one correspondence with N logical addresses included in the first logical address set, and N is an integer greater than or equal to 2; and a sending unit, configured to send a first request to a storage chip connected to the host chip, where the first request includes the first indication information.

In one embodiment, the first request further includes first control information, the first control information includes a first field, and the first field is used to indicate N.

In one embodiment, the first control information further includes a second field; and the second field is used to indicate an access granularity of each physical address in the first physical address set; or the second field is used to indicate an access granularity of each logical address in the first logical address set; or the second field is used to indicate a sum of an access granularity of each physical address in the first physical address set and an access granularity of each logical address in the first logical address set, where the access granularity of each physical address in the first physical address set is the same as the access granularity of each logical address in the first logical address set.

In one embodiment, the host chip further includes an allocation unit, configured to allocate an extension header field EHS extended domain, where the EHS extended domain is used to carry the first indication information.

In one embodiment, the first control information is carried in a first reserved field in a UPIU protocol frame.

In one embodiment, the host chip further includes a receiving unit, configured to receive a first response message from the storage chip, where the first response message includes second indication information, the second indication information includes the first logical address set and a second physical address set, the second physical address set is a physical address set that corresponds to the first logical address set after the mapping relationship between a logical address and a physical address is updated, the second physical address set includes N physical addresses, and the N physical addresses are in a one-to-one correspondence with the N logical addresses.

In one embodiment, the first response message further includes second control information, the second control information includes a third field, and the third field is used to indicate N.

In one embodiment, the second control information further includes a fourth field; and the fourth field is used to indicate an access granularity of each physical address in the second physical address set; or the fourth field is used to indicate an access granularity of each logical address in the first logical address set; or the fourth field is used to indicate a sum of an access granularity of each physical address in the second physical address set and an access granularity of each logical address in the first logical address set, where the access granularity of each physical address in the second physical address set is the same as the access granularity of each logical address in the first logical address set.

In one embodiment, the EHS extended domain is further used to carry the second indication information.

In one embodiment, the second control information is carried in a second reserved field in the UPIU protocol frame.

In one embodiment, the sending unit is further configured to send a second request to the storage chip. The host chip further includes a receiving unit, configured to receive a second response message from the storage chip; and an updating unit, configured to update the mapping relationship between a logical address and a physical address in the host chip based on third indication information. The second request includes a second logical address set and second data, and the second data includes data to be written into the storage chip. The second response message includes the third indication information, the third indication information includes the second logical address set and a third physical address set corresponding to the second logical address set, the third physical address set includes M physical addresses, the M physical addresses are in a one-to-one correspondence with M logical addresses included in the second logical address set, the third physical address set is used to store the second data, and M is an integer greater than or equal to 3.

In one embodiment, the second response message further includes third control information, the third control information includes a fifth field, and the fifth field is used to indicate M.

In one embodiment, the third control information further includes a sixth field; and the sixth field is used to indicate an access granularity of each physical address in the third physical address set; or the sixth field is used to indicate an access granularity of each logical address in the second logical address set; or the sixth field is used to indicate a sum of an access granularity of each physical address in the third physical address set and an access granularity of each logical address in the second logical address set, where the access granularity of each physical address in the third physical address set is the same as the access granularity of each logical address in the second logical address set.

In one embodiment, the EHS extended domain is further used to carry the third indication information.

In one embodiment, the third control information is carried in a third reserved field in the UPIU protocol frame.

According to a twelfth aspect, an embodiment of this application further provides a storage chip, which is configured to perform the implementations of the sixth aspect. The storage chip is connected to a universal flash storage UFS protocol information unit UPIU, and the storage chip includes:

a receiving unit, configured to receive a first request from a host chip connected to the storage chip, where the first request includes first indication information, the first indication information includes a first logical address set and a first physical address set that is determined based on a mapping relationship between a logical address and a physical address and that corresponds to the first logical address set, the first physical address set includes N physical addresses, the N physical addresses are in a one-to-one correspondence with N logical addresses included in the first logical address set, and N is an integer greater than or equal to 2; an obtaining unit, configured to obtain first data based on the first physical address set, where the first data includes data stored in the first physical address set; and a sending unit, configured to send the first data to the host chip.

In one embodiment, the first request further includes first control information, the first control information includes a first field, and the first field is used to indicate N.

In one embodiment, the first control information further includes a second field; and the second field is used to indicate an access granularity of each physical address in the first physical address set; or the second field is used to indicate an access granularity of each logical address in the first logical address set; or the second field is used to indicate a sum of an access granularity of each physical address in the first physical address set and an access granularity of each logical address in the first logical address set, where the access granularity of each physical address in the first physical address set is the same as the access granularity of each logical address in the first logical address set.

In one embodiment, the first indication information is carried in an extension header field EHS extended domain, and the EHS extended domain is allocated by the host chip.

In one embodiment, the first control information is carried in a first reserved field in a UPIU protocol frame.

In one embodiment, the sending unit is further configured to: when it is determined that the mapping relationship between a logical address and a physical address changes, send a first response message to the host chip. The first response message includes second indication information, the second indication information includes the first logical address set and a second physical address set, the second physical address set is a physical address set that corresponds to the first logical address set after the mapping relationship between a logical address and a physical address changes, the second physical address set includes N physical addresses, and the N physical addresses are in a one-to-one correspondence with the N logical addresses.

In one embodiment, the first response message further includes second control information, the second control information includes a third field, and the third field is used to indicate N.

In one embodiment, the second control information further includes a fourth field; and the fourth field is used to indicate an access granularity of each physical address in the second physical address set; or the fourth field is used to indicate an access granularity of each logical address in the first logical address set; or the fourth field is used to indicate a sum of an access granularity of each physical address in the second physical address set and an access granularity of each logical address in the first logical address set, where the access granularity of each physical address in the second physical address set is the same as the access granularity of each logical address in the first logical address set.

In one embodiment, the second indication information is carried in the EHS extended domain.

In one embodiment, the second control information is carried in a second reserved field in the UPIU protocol frame.

In one embodiment, the receiving unit is further configured to receive a second request from the host chip connected to the storage chip, where the second request includes a second logical address set and second data, and the second data includes data to be written into the storage chip.

The storage chip further includes a generation unit, configured to: after second data is written into the storage chip, generate third indication information based on a changed mapping relationship between a logical address and a physical address. The sending unit is further configured to send a second response message for the second request to the host chip. The second request includes a second logical address set and the second data, and the second data includes data to be written into the storage chip. The third indication information includes the second logical address set and a third physical address set corresponding to the second logical address set, the third physical address set includes M physical addresses, the M physical addresses are in a one-to-one correspondence with M logical addresses included in the second logical address set, the third physical address set is used to store the second data, and M is an integer greater than or equal to 3. The second response message includes the third indication information, and the second response message is used to indicate to update the mapping relationship between a logical address and a physical address in the host chip.

In one embodiment, the second response message further includes third control information, the third control information includes a fifth field, and the fifth field is used to indicate M.

In one embodiment, the third control information further includes a sixth field; and the sixth field is used to indicate an access granularity of each physical address in the third physical address set; or the sixth field is used to indicate an access granularity of each logical address in the second logical address set; or the sixth field is used to indicate a sum of an access granularity of each physical address in the third physical address set and an access granularity of each logical address in the second logical address set, where the access granularity of each physical address in the third physical address set is the same as the access granularity of each logical address in the second logical address set.

In one embodiment, the third indication information is carried in the EHS extended domain.

In one embodiment, the third control information is carried in a third reserved field in the UPIU protocol frame.

According to a thirteenth aspect, an embodiment of this application further provides a host chip. The host chip includes a processor, a memory, and a communications interface, and the processor is connected to the memory and the communications interface by using a line. The memory is configured to store a program. The processor is configured to execute the program stored in the memory, so that the processor performs corresponding functions in the implementations described in the first aspect, the fourth aspect, and the fifth aspect. The communications interface is configured to support communication between the host chip and another network.

According to a fourteenth aspect, an embodiment of this application further provides a storage chip. The storage chip includes a processor, a memory, and a communications interface, and the processor is connected to the memory and the communications interface by using a line. The memory is configured to store a program. The processor is configured to execute the program stored in the memory, so that the processor performs corresponding functions in the implementations described in the second aspect, the third aspect, and the sixth aspect. The communications interface is configured to support communication between the storage chip and another network.

According to a fifteenth aspect, an embodiment of this application provides a terminal device. The terminal device includes a host chip and a storage chip, and the host chip includes the host chip in one or more of the seventh aspect, the tenth aspect, and the eleventh aspect. The storage chip includes the storage chip in one or more of the eighth aspect, the ninth aspect, and the twelfth aspect.

According to a sixteenth aspect, an embodiment of this application provides a chip system. The chip system includes a host chip and a storage chip, and the host chip includes the host chip in one or more of the seventh aspect, the tenth aspect, and the eleventh aspect. The storage chip includes the storage chip in one or more of the eighth aspect, the ninth aspect, and the twelfth aspect.

According to a seventeenth aspect, an embodiment of this application provides a computer-readable storage medium. The computer-readable storage medium stores an instruction, and when the instruction is run on a computer, the computer is enabled to perform the procedure of the method in one or more of the first aspect, the second aspect, the third aspect, the fourth aspect, the fifth aspect, and the sixth aspect.

According to an eighteenth aspect, an embodiment of this application provides a computer program. The computer program includes an instruction, and when the computer program is executed by a computer, the computer is enabled to perform the procedure of the method in one or more of the first aspect, the second aspect, the third aspect, the fourth aspect, the fifth aspect, and the sixth aspect.

BRIEF DESCRIPTION OF DRAWINGS

FIG. 9a is a schematic diagram of an EHS extended domain according to an embodiment of this application;

FIG. 9b is a schematic diagram of another EHS extended domain according to an embodiment of this application;

DESCRIPTION OF EMBODIMENTS

The following describes the embodiments of this application with reference to the accompanying drawings in the embodiments of this application.

In the specification, claims, and accompanying drawings of this application, the terms "first", "second", and the like are intended to distinguish between different objects, but are not intended to describe a particular order. In addition, the terms "including", "having", and any other variant thereof are intended to cover non-exclusive inclusion. For example, a process, method, system, product, or device that includes a series of operations or units is not limited to the listed operations or units, but in one embodiment, further includes an unlisted operation or unit, or in one embodiment, further includes another inherent operation or unit of the process, method, product, or device.

Some technical terms used in this application are first described.

Logical address: The logical address is a relative address used in a user program. In the embodiments of this application, the logical address may include an LBA and the like.

Physical address: The physical address is an absolute address of an actual storage unit. In the embodiments of this application, the physical address may include a PPN, a physical block address (PBA), an address smaller than a page, or the like. For example, the address smaller than the page may include an address whose access granularity is 4 KB. This is not limited in the embodiments of this application. It may be understood that the storage unit may be a storage unit in a storage chip or the like.

Figure 1B:
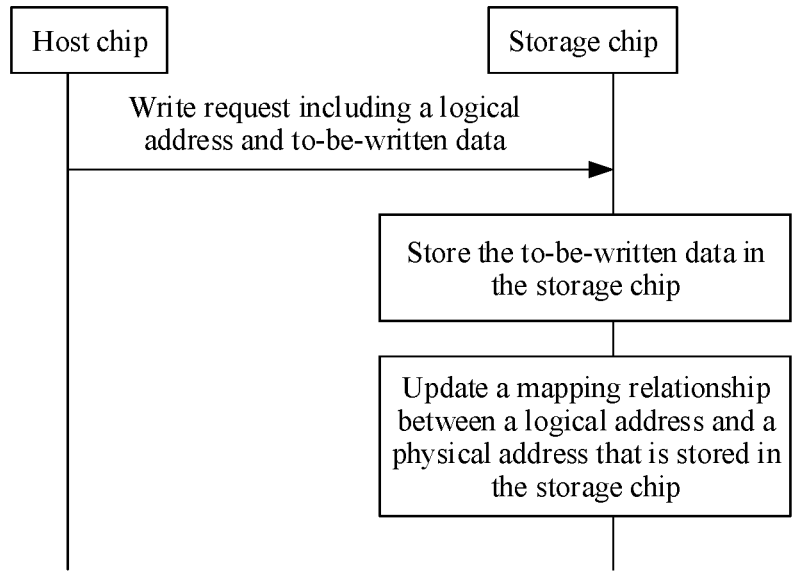
FIG. 1b is a schematic flowchart of processing a write request according to an embodiment of this application.
Figure 1A:
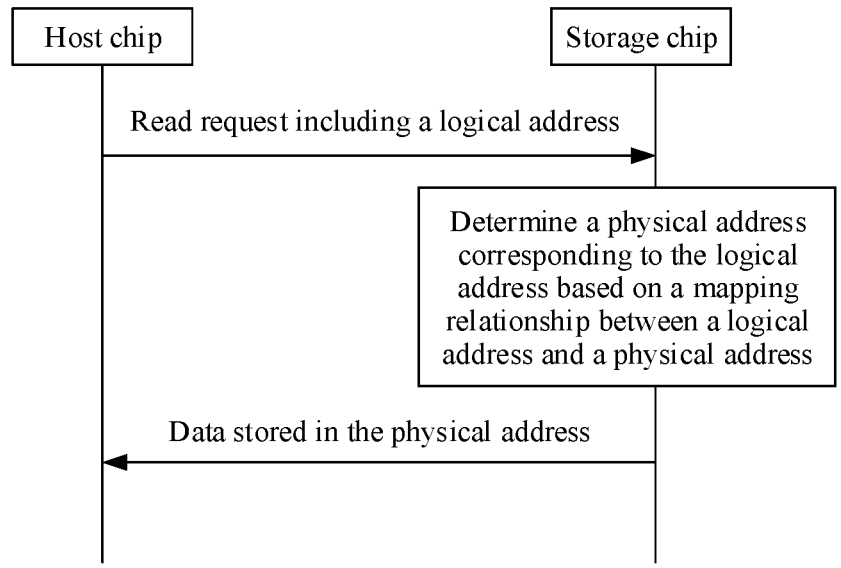
FIG. 1a is a schematic flowchart of processing a read request according to an embodiment of this application.

Mapping relationship between a logical address and a physical address: During specific application, the mapping relationship between a logical address and a physical address is stored in a storage chip, and when a host chip needs to read data in the storage chip, the host chip sends a read request including a logical address to the storage chip. After receiving the read request, the storage chip determines a physical address corresponding to the logical address based on the mapping relationship between a logical address and a physical address. Then, the storage chip sends the data stored in the physical address to the host chip. This is shown in FIG. 1a. When the host chip needs to write data, the host chip sends a write request including a logical address and to-be-written data to the storage chip. After receiving the write request, the storage chip stores the to-be-written data in the storage chip, and updates the mapping relationship between a logical address and a physical address that is stored in the storage chip. This is shown in FIG. 1b.

In one embodiment, the mapping relationship between a logical address and a physical address may also be referred to as a table of mapping between a logical address and a physical address, a table of mapping between an LBA and a PPN, a table of mapping between an LBA and a PBA, or the like. A specific name of the mapping relationship between a logical address and a physical address is not limited in the embodiments of this application.

In the embodiments of this application, the mapping relationship between a logical address and a physical address may be stored in a host chip, or may be stored in a storage chip. The mapping relationship between a logical address and a physical address is stored in the host chip, so that a case in which the storage chip cannot find the mapping relationship can be effectively avoided, a process such as multi-level search by the storage chip can be avoided, and the like, thereby improving search efficiency and further increasing a response speed. In one embodiment, the mapping relationship between a logical address and a physical address that is stored in the host chip may also be referred to as a copy of the mapping relationship between a logical address and a physical address, a copy of the table of mapping between a logical address and a physical address, or the like. This is not limited in this application.

The following specifically describes the host chip and the storage chip in the embodiments of this application.

Figure 2:
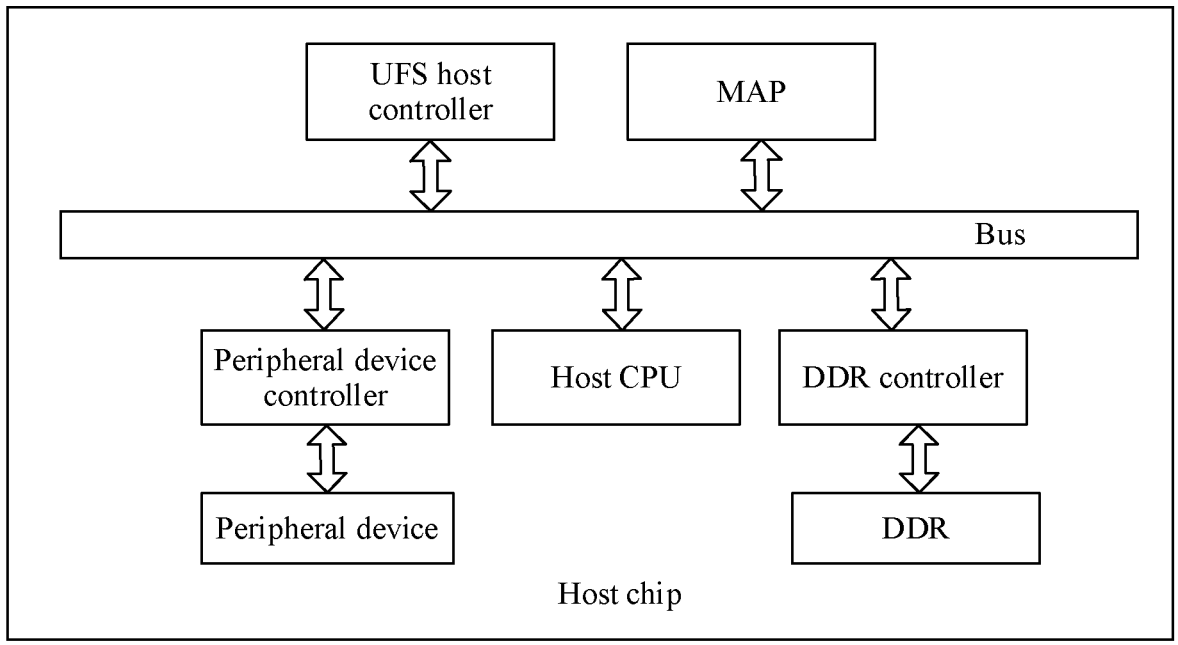
FIG. 2 is a schematic structural diagram of a host chip according to an embodiment of this application.

FIG. 2 is a schematic structural diagram of a host chip according to an embodiment of this application. The host chip may be connected to a universal flash storage (UFS) protocol information unit (UPIU). As shown in FIG. 2, the host chip may include a host central processing unit (CPU), a multimedia application processor (MAP), a UFS host controller, a double data rate synchronous dynamic random access memory (DDR SDRAM) controller, a DDR SDRAM memory, a peripheral device controller, and a peripheral device. It may be understood that the DDR SDRAM may also be referred to as a DDR for short in this embodiment of this application.

The host CPU and the MAP may be configured to be coupled to a memory, to execute a program instruction or the like stored in the memory. For example, the host CPU and the MAP may be configured to run software running on the host chip such as an operating system, an application, or a driver. In this embodiment of this application, the memory may be further configured to store a mapping relationship between a logical address and a physical address. It may be understood that the memory includes the DDR in this embodiment of this application.

The UFS host controller may be configured to send one or more of a read request or a write request that conform to a UPIU protocol frame. In this embodiment of this application, the UFS host controller may be further configured to enable indication information (for example, first indication information in the following embodiments) and the like included in the read request to be carried in an EHS extended domain allocated by a UFS driver (not shown in the figure). The EHS extended domain may include at least 2016B space. In other words, the read request sent by the UFS host controller in this embodiment of this application may occupy at least 2 KB space, for example, including a 32B UPIU frame header and a 2016B EHS extended domain. The EHS extended domain enables the host chip to carry more physical address information such as the first indication information when sending a UPIU request to a storage chip.

The DDR controller may be configured to control the DDR. For example, the DDR controller may be configured to control updating of the mapping relationship between a logical address and a physical address in the DDR.

The peripheral device may include an input and output interface, an external memory, an analog-to-digital converter, a digital-to-analog converter, a peripheral processor, and the like. For example, the peripheral device may include a touchscreen, a camera, a fingerprint collection component, a near field communications element, various sensors, and the like. The peripheral device is not limited in this embodiment of this application. The peripheral device controller may be configured to control the peripheral device.

It may be understood that the host chip may be various forms of chips. For example, the host chip may be integrated into SOC. In one embodiment, the host chip may be applied to various terminal devices. For example, the host chip may be applied to a mobile phone or a notebook computer. This is not limited in this embodiment of this application.

It may be understood that the host chip shown in FIG. 2 is merely an example provided in this embodiment of this application, and the host chip may have more or fewer components than those shown in the figure, may combine two or more components, may have different configurations of different components, or the like.

Figure 3:
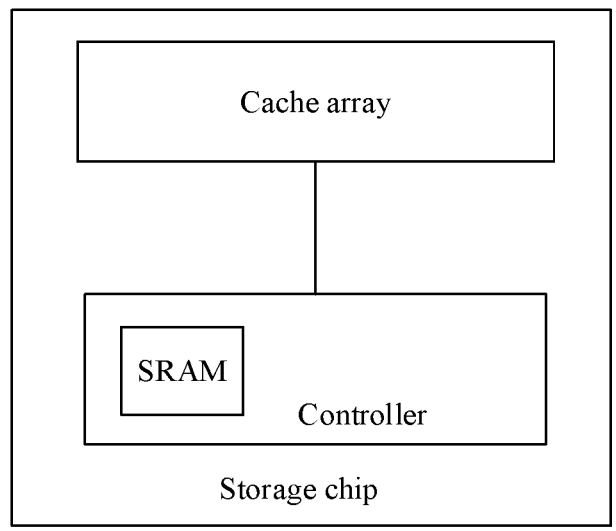
FIG. 3 is a schematic structural diagram of a storage chip according to an embodiment of this application.

FIG. 3 is a schematic structural diagram of a storage chip according to an embodiment of this application. The storage chip may be connected to a UPIU. As shown in FIG. 3, the storage chip includes a controller and a cache array (that is, a flash array). The controller and the flash array may be connected to each other by using a line.

Specifically, the controller is a core component of the storage chip, and may be configured to properly allocate load of data on each flash array, and the controller may be further configured to forward data and connect the flash array and an external serial interface.

In one embodiment, the controller may further include a hardware chip. For example, the hardware chip may be an application-specific integrated circuit (ASIC) or a field programmable logic gate array (FPGA). This is not limited in this embodiment of this application.

Further, the controller may include a static random access memory (SRAM). In this embodiment of this application, the SRAM may be configured to store a mapping relationship between a logical address and a physical address.

In one embodiment, the storage chip may be various forms of chips. In one embodiment, the storage chip may be applied to various storage apparatuses. For example, the storage chip may be applied to a solid state disk (SSD). This is not limited in this embodiment of this application. In one embodiment, the storage chip may alternatively be applied to various terminal devices. For example, the storage chip may be applied to a mobile phone or a notebook computer.

In this embodiment of this application, the storage chip may receive information that includes an EHS extended domain and that is sent by a host chip, so as to send more information including an updated mapping relationship between a physical address and a logical address to the host chip by using the EHS extended domain.

It may be understood that the storage chip shown in FIG. 3 is merely an example provided in this embodiment of this application, and the storage chip may have more or fewer components than those shown in the figure, may combine two or more components, may have different configurations of different components, or the like.

Figure 4:
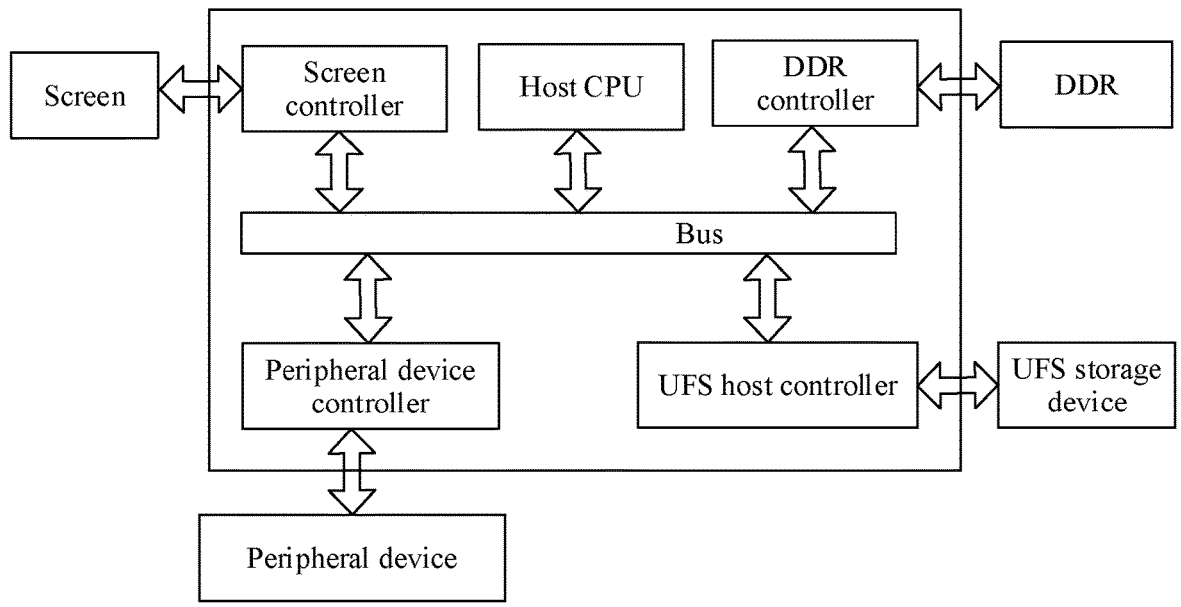
FIG. 4 is a schematic structural diagram of a terminal device according to an embodiment of this application.

FIG. 4 is a schematic structural diagram of a terminal device according to an embodiment of this application. As shown in FIG. 4, the terminal device may include a screen, a screen controller, a host chip, and a UFS storage device. The host chip may be the host chip shown in FIG. 2. For example, the host chip may include a peripheral device, a peripheral device controller, a DDR, a DDR controller, a UFS host controller, and a host CPU. The UFS storage device may be the storage chip shown in FIG. 3, and components included in the UFS storage device are not shown in FIG. 4.

Specifically, the UFS host controller is connected to the UFS storage device, and the UFS host controller may be configured to interact with the UFS storage device, so that the terminal device can read data in the UFS storage device through the UFS host controller. In addition, the UFS storage device may be further configured to: when the data stored in the UFS storage device changes, send, to the UFS host controller, information used to indicate to update a mapping relationship, so that the host CPU controls the DDR controller to update, in time, the mapping relationship between a logical address and a physical address that is stored in the DDR.

Specifically, the host CPU may include an RISC microprocessor (advanced RISC machines, ARM) and the like. A specific type or model of the host CPU is not limited in this embodiment of this application.

It may be understood that the terminal device shown in FIG. 4 is merely an example, and should not be understood as a limitation on this embodiment of this application.

Figure 5:
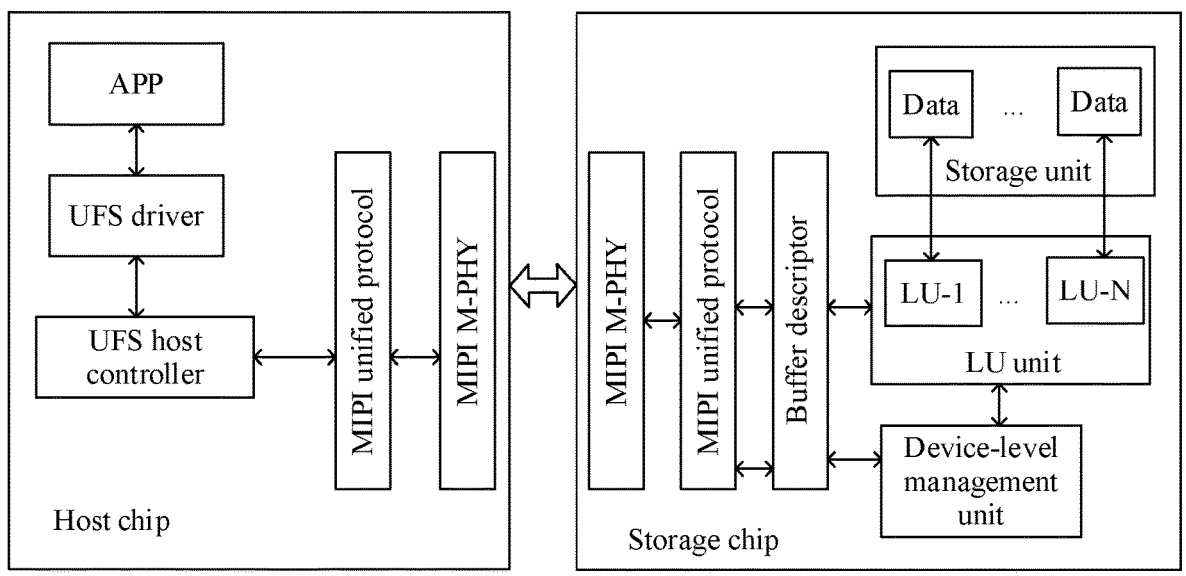
FIG. 5 is a schematic architectural diagram of a chip system according to an embodiment of this application.

FIG. 5 is a schematic diagram of a specific scenario of a chip system according to an embodiment of this application. The chip system may include a host chip and a storage chip. The host chip may be the host chip shown in FIG. 2, and the storage chip may be the storage chip shown in FIG. 3.

In one embodiment, the host chip may further include an application (APP), a UFS driver, and a UFS host controller, and has a mobile industry processor interface (MIPI) transport layer, an MIPI physical layer, and the like. The storage chip may further include a storage unit, a logical unit (LU), and a device-level management unit, and has an MIPI physical layer, an MIPI transport layer, and a buffer descriptor.

As shown in FIG. 5, when the host chip needs to read first data, the host chip obtains a logical address from the APP. After the logical address passes through the UFS driver, the host chip sends a read request that carries the logical address, and after the read request passes through the UFS host controller, sends a read request that conforms to a UPIU protocol frame. Then, the read request passes through the transport layer, for example, may pass through an MIPI unified protocol (MIPI Unipro). Finally, after the read request passes through the MIPI physical layer (PHY), the host chip sends the read request to the storage chip.

After the storage chip receives the read request, the read request may sequentially pass through the MIPI physical layer and the MIPI transport layer. Then, after passing through the buffer descriptor, the read request passes through the LU. After the read request is calculated by the LU, the storage chip may read the data stored in the storage unit.

A data flow sent from the buffer descriptor may pass through the LU, and a control flow sent from the buffer descriptor may pass through the device-level management unit. Specifically, the device-level management unit may be configured to receive the control flow sent from the buffer descriptor. For example, the control flow may be used to control a configuration of the LU. This is not limited in this embodiment of this application.

It may be understood that the chip system shown in FIG. 5 is merely an example provided in this embodiment of this application, and the chip system may have more or fewer components than those shown in the figure, may combine two or more components, may have different configurations of different components, or the like. For example, the host CPU included in the host chip is not shown, but this should not be understood as a limitation on this embodiment of this application.

The following specifically describes an information processing method in the embodiments of this application.

During actual application, when a host chip sends a read request including a logical address to a storage chip, the host chip may indicate the logical address by using a start address plus a length of the logical address. In other words, the host chip may send, through a UFS controller, a UPIU request (command UPIU, CMD@UPIU) that conforms to a UPIU protocol frame.

In an embodiment, when a mapping relationship between a logical address and a physical address is stored in the host chip and the storage chip, the host chip sends a read request to the storage chip. For example, the read request may include a 4 KB read request, an 8 KB read request, a 16 KB read request, and a 32 KB read request. For the 4 KB read request, READ_10 may be used, that is, the host chip may send a read request including a mapping relationship between a pair of a logical address and a physical address to the storage chip. The pair may be 8-byte, that is, the 4-byte logical address and the 4-byte physical address. Specifically, for example, the mapping relationship between a pair of a logical address and a physical address may be indicated to the storage chip by using a start address plus a length of the logical address and a start address plus a length of the physical address. That is, the 4-byte logical address and the 4-byte physical address (in a one-to-one correspondence) may express the 4 KB read request.

However, for the 8 KB read request that is logically consecutive, because garbage collection and wear leveling continuously occur on the storage chip, there is a high probability that the 8 KB read request is physically inconsecutive. Consequently, limited by native available space of the CMD@UPIU, the host chip cannot fill in a plurality of pairs of discrete physical addresses, that is, cannot support a read request larger than 8 KB.

In addition, in another embodiment, when a mapping relationship between a logical address and a physical address is stored in the host chip and the storage chip, after the storage chip updates the mapping relationship between a logical address and a physical address, for example, after the storage chip completes writing, the storage chip needs to send an updated mapping relationship between a logical address and a physical address to the host chip, so that the host chip updates the mapping relationship between a logical address and a physical address that is stored in the host chip.

In a standard UPIU, only a maximum of two pairs (16 bytes) of mapping relationships can be contained in 20-byte sense data. Consequently, tens of millions of mapping relationships for the write request possibly cannot be updated in time. That is, limited by native available space of a UPIU response (response UPIU, RESP@UPIU), the storage chip cannot fill in a plurality of pairs of mapping relationships when indicating the updated mapping relationship to the host chip. Further, when a large quantity of mapping relationships between a logical address and a physical address are updated, the foregoing manner may severely affect system performance.

Therefore, the embodiments of this application provide a method, so that a host chip can fill in a plurality of pairs of discrete physical addresses, and a storage chip can fill in a plurality of pairs of or even a large quantity of mapping relationships.

Figure 6:
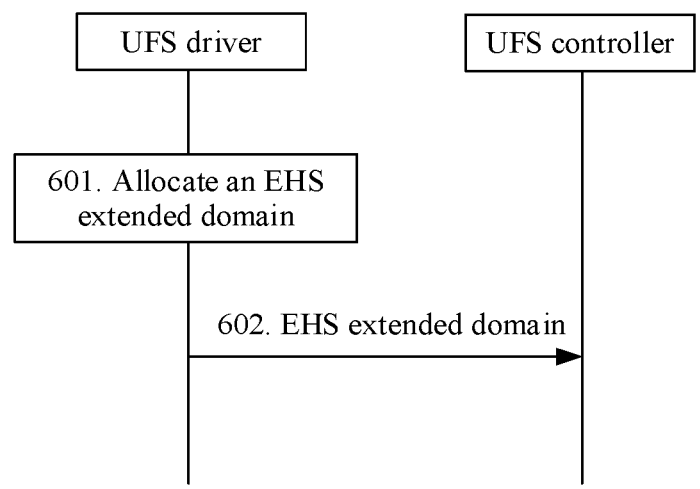
FIG. 6 is a schematic flowchart of an allocation method according to an embodiment of this application.

FIG. 6 is a schematic flowchart of an allocation method according to an embodiment of this application. The method may be applied to the host chip shown in FIG. 2. The UFS host controller in FIG. 2 may be configured to support and perform a method procedure 602 shown in FIG. 6. In one embodiment, the method may alternatively be applied to the host chip shown in FIG. 5. The UFS driver in FIG. 5 may be configured to support and perform a method procedure 601 shown in FIG. 6, and the UFS host controller in FIG. 5 may be configured to support and perform a method procedure 602 shown in FIG. 6. As shown in FIG. 6, the allocation method includes the following operations.

601. The UFS drive allocates an EHS extended domain.

In this embodiment of this application, the EHS extended domain may also be referred to as EHS extended space. Alternatively, the EHS extended domain may have another name or the like. This is not limited in this embodiment of this application. Specifically, the EHS extended domain may include at least 2016B extended space. More specifically, the EHS extended domain may be allocated through UFS driver software of the host chip. For example, the driver software may include a Kirin UFS driver of the Huawei Kirin platform.

602. The UFS driver sends the EHS extended domain to the UFS controller.

The EHS extended domain is used to carry one or more of a read request and a write request that are sent by the host chip. In other words, the EHS extended domain may be used to indicate that the UFS controller carries a UPIU request that conforms to a UPIU protocol frame, for example, first indication information included in the read request.

In one embodiment, for how the UFS driver sends the EHS extended domain to the UFS controller, this embodiment of this application further provides the following two implementations:

Implementation 1

The UFS driver sends a start address of the EHS extended domain to the UFS controller.

In this implementation, the host chip may set or plan a length of the EHS extended domain in advance. Further, the host chip may alternatively negotiate with a storage chip about a length of the EHS extended domain in advance. For example, the host chip may negotiate with the storage chip about the length of the EHS extended domain as 2016B in advance.

Implementation 2

The UFS driver sends a start address and a length of the EHS extended domain to the UFS controller.

In this implementation, the length of the EHS extended domain may change, that is, the host chip may set the length of the EHS extended domain based on a requirement.

It may be understood that, after the host chip sends a read request or a write request to the storage chip, the storage chip may further return a response message, for example, a first response message and a second response message in the following embodiment. Second indication information in the first response message and third indication information in the second response message may be further carried in the EHS extended domain.

Specifically, when the host chip sends a read request, an EHS extended domain that carries first indication information in the read request may be same as or different from an EHS extended domain that carries second indication information in a first response message (or third indication information in a second response message) returned by the storage chip. This is not limited in this embodiment of this application. It may be understood that a same EHS extended domain may indicate a same format, but does not indicate same content filled in the EHS extended domain.

Further, when the host chip sends a read request to the storage chip, first control information in the read request (for example, a first request) may be carried in a first reserved field in a UPIU protocol frame, second control information in a first response message returned by the storage chip may be carried in a second reserved field in the UPIU protocol frame, and third control information in a second response message returned by the storage chip may be carried in a third reserved field in the UPIU protocol frame.

It may be understood that the second reserved field and the third reserved field may be a same field, may be different fields, or the like. This is not limited in this embodiment of this application. The first control information and the second control information may be carried in a same UPIU protocol frame, may be carried in different UPIU protocol frames, or the like. This is not limited in this embodiment of this application. The first control information and the third control information may be carried in a same UPIU protocol frame, may be carried in different UPIU protocol frames, or the like. This is not limited in this embodiment of this application. Therefore, the first reserved field and the second reserved field (or the third reserved field) may be a same field, may be different fields, or the like. This is not limited in this embodiment of this application.

It may be understood that the UFS controller in this embodiment of this application may be the UFS host controller shown in FIG. 2, FIG. 4, and FIG. 5. Therefore, the UFS controller should not be understood as a limitation on this embodiment of this application.

Figure 7:
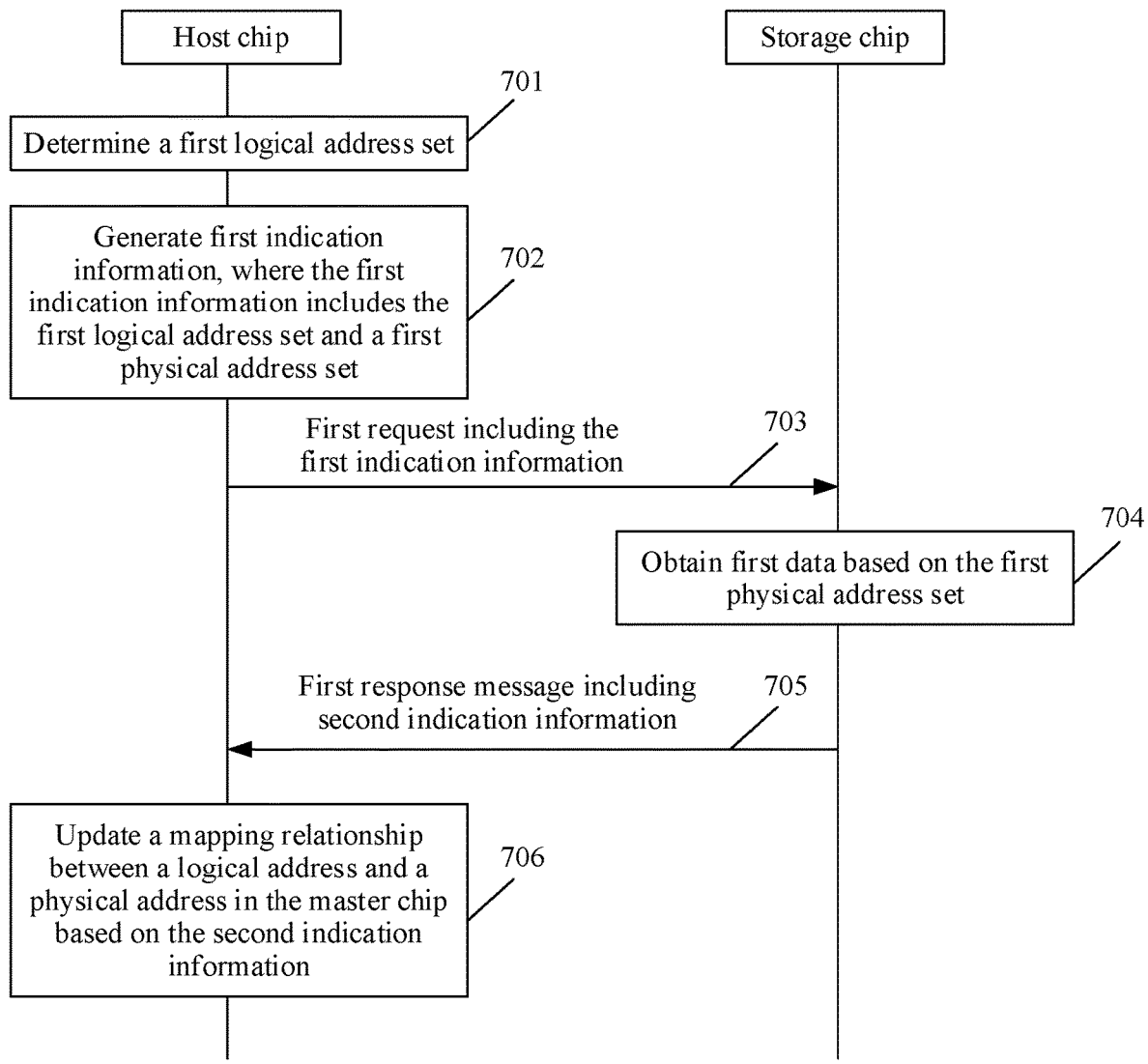
FIG. 7 is a schematic flowchart of an information processing method according to an embodiment of this application.

Based on the allocation method shown in FIG. 6, FIG. 7 is a schematic flowchart of an information processing method according to an embodiment of this application. The information processing method may be applied to the host chip and the storage chip shown in FIG. 2 to FIG. 5. For example, the method may be applied to the host chip shown in FIG. 2, and the host CPU in FIG. 2 may be configured to support and perform method procedures 701, 702, and 706 shown in FIG. 7. For another example, the controller shown in FIG. 3 may be configured to support and perform a method procedure 704 shown in FIG. 7. As shown in FIG. 7, the communications method includes the following operations.

701. The host chip determines a first logical address set.

In this embodiment of this application, the first logical address set determined by the host chip may correspond to at least an 8 KB read request. It may be understood that logical addresses included in the first logical address set may be consecutive, or may be inconsecutive. This is not limited in this embodiment of this application.

702. The host chip generates first indication information, where the first indication information includes the first logical address set and a first physical address set that is determined based on a mapping relationship between a logical address and a physical address and that corresponds to the first logical address set, the first physical address set includes N physical addresses, and the N physical addresses are in a one-to-one correspondence with N logical addresses included in the first logical address set.

In this embodiment of this application, the first physical address set may include N discrete physical addresses. Specifically, the host chip may divide the first logical address set into a quantity of logical addresses based on a quantity of physical addresses included in the first physical address set. For example, if the first physical address set includes N physical addresses, and each of the N physical addresses corresponds to one logical address, the first logical address set (for example, logical addresses included in the first logical address set are consecutive) may be divided into N logical addresses, and the N logical addresses respectively correspond to the N physical addresses, that is, one physical address corresponds to one logical address. It may be understood that N is an integer greater than or equal to 2.

703. The host chip sends a first request to a storage chip connected to the host chip, where the first request includes the first indication information.

In this embodiment of this application, the first request may be used to request to read data corresponding to the first logical address set. That is, the first request may be used to request first data, and the first data includes data stored in the first physical address set.

Further, the first request may further include first control information, the first control information includes a first field, and the first field is used to indicate N. N may represent a quantity of discrete physical addresses in the first physical address set, or may represent a quantity of logical addresses in the first logical address set after the first logical address set is obtained through division. Specifically, N is an integer greater than or equal to 2.

Moreover, the first control information further includes a second field. The second field is used to indicate an access granularity of each physical address in the first physical address set; or the second field is used to indicate an access granularity of each logical address in the first logical address set; or the second field is used to indicate a sum of an access granularity of each physical address in the first physical address set and an access granularity of each logical address in the first logical address set, where the access granularity of each physical address in the first physical address set is the same as the access granularity of each logical address in the first logical address set.

In this embodiment of this application, the access granularity may indicate a unit for storing each address in the first indication information. More generally, the access granularity may indicate a quantity of bytes for storing each logical address or each physical address. As described in the foregoing implementation, a mapping relationship between a pair of a logical address and a physical address may be 8-byte, that is, a 4-byte logical address and a 4-byte physical address. The access granularity may be represented by using four bytes or eight bytes.

In this embodiment of this application, the first physical address set includes the N physical addresses, and the first logical address set includes the N logical addresses. In other words, it indicates that there are N mapping relationships. In this case, eight bytes may be used to represent each of the N mapping relationships.

It may be understood that the foregoing access granularity is merely an example, and more or fewer bytes than four bytes (an access granularity of each physical address or an access granularity of each logical address) may be used to represent the access granularity, or more or fewer bytes than eight bytes (that is, a sum of an access granularity of each physical address and an access granularity of each logical address) may be used to represent the access granularity. This is not limited in this embodiment of this application.

It may be understood that the first indication information may be carried in an EHS extended domain allocated by the host chip, and the first control information may be carried in a first reserved field in a UPIU protocol frame.

704. The storage chip receives the first request from the host chip, and obtains the first data based on the first physical address set, where the first data includes the data stored in the first physical address set.

In this embodiment of this application, after the storage chip receives the first request, if the mapping relationship between a logical address and a physical address in the storage chip does not change, the storage chip may return the first data to the host chip, that is, the storage chip sends the first data to the host chip. Specifically, when the storage chip sends the first data to the host chip, the storage chip may add the first data to space other than the UPIU protocol frame and the EHS extended domain. For example, the storage chip may integrate data (which may be N pieces of data, or may be less than N pieces of data) stored in the N physical addresses into one piece of data, so as to add the data to the data space and send the data to the host chip. It may be understood that the data space in which the first data is carried is merely an example. In specific implementation, another implementation or the like may be further included. This is not limited in this embodiment of this application.

In this embodiment of this application, the mapping relationship between a logical address and a physical address is stored in the host chip with relatively large space, so that a response speed of a read request can be effectively increased. In addition, the first indication information is generated, the first indication information may be used to indicate the first physical address set, and the first physical address set includes at least two physical addresses, so as to implement an 8 KB, 16 KB, or even 32 KB read request, thereby effectively implementing efficiency of real-time information exchange between the host chip and the storage chip.

However, during actual application, because of an operation such as wear leveling (WL) or garbage collection (GC), a physical address of data stored in the storage chip may change. Therefore, after determining that the mapping relationship between a logical address and a physical address changes, the storage chip further needs to notify the host chip of the change, so as to improve information exchange efficiency. For the foregoing case, refer to the following operations:

705. When determining that the mapping relationship between a logical address and a physical address changes, the storage chip sends a first response message to the host chip.

The first response message includes second indication information, the second indication information includes the first logical address set and a second physical address set, the second physical address set is a physical address set that corresponds to the first logical address set after the mapping relationship between a logical address and a physical address is updated, the second physical address set includes N physical addresses, and the N physical addresses are in a one-to-one correspondence with the N logical addresses. In addition, the second indication information may be further used to indicate the host chip to update the mapping relationship between a logical address and a physical address in the host chip.

Further, the first response message further includes second control information, the second control information includes a third field, and the third field is used to indicate N.

Moreover, the second control information further includes a fourth field. The fourth field is used to indicate an access granularity of each physical address in the second physical address set; or the fourth field is used to indicate an access granularity of each logical address in the first logical address set; or the fourth field is used to indicate a sum of an access granularity of each physical address in the second physical address set and an access granularity of each logical address in the first logical address set, where the access granularity of each physical address in the second physical address set is the same as the access granularity of each logical address in the first logical address set.

706. The host chip receives the first response message, and updates the mapping relationship between a logical address and a physical address in the host chip based on the second indication information.

It may be understood that the second indication information may be carried in the EHS extended domain, and the second control information may be carried in a second reserved field in the UPIU protocol frame.

In this embodiment of this application, a mapping relationship between the N logical addresses and the N physical addresses is indicated to the storage chip, so that a case in which the storage chip cannot determine corresponding data (the first data) based only on a physical address because the mapping relationship between a logical address and a physical address that is stored in the storage chip changes can be avoided, thereby further improving efficiency of information exchange between the host chip and the storage chip.

The foregoing focuses on a specific implementation of the read request, and the following focuses on a specific implementation of a write request.

Figure 8:
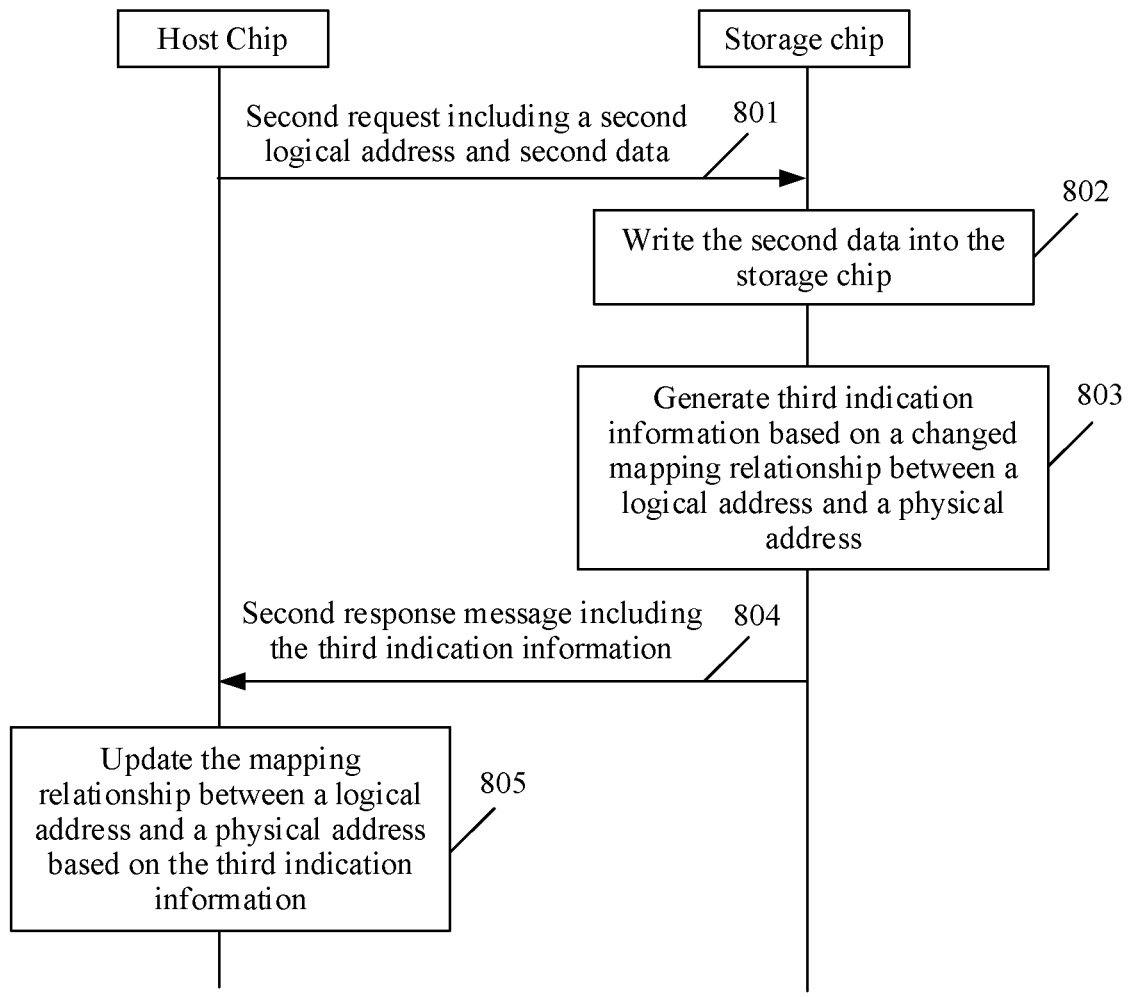
FIG. 8 is a schematic flowchart of another information processing method according to an embodiment of this application.

FIG. 8 is a schematic flowchart of another information processing method according to an embodiment of this application. The information processing method may be applied to the host chip and the storage chip shown in FIG. 2 to FIG. 5. As shown in FIG. 8, the information processing method includes the following operations.

801. The host chip sends a second request to the storage chip connected to the host chip, where the second request includes a second logical address set and second data, and the second data includes data to be written into the storage chip.

In this embodiment of this application, the second logical address set is a logical address of the second data. The second data includes the data to be written into the storage chip. It may be understood that a size or a type of the second data is not limited in this embodiment of this application.

802. The storage chip receives the second request from the host chip, and writes the second data into the storage chip.

803. The storage chip generates third indication information based on a changed mapping relationship between a logical address and a physical address.

In this embodiment of this application, after the storage chip writes the second data into the storage chip, the storage chip may generate the third indication information based on the physical address of the second data and the logical address of the second data. The third indication information includes the second logical address set and a third physical address set corresponding to the second logical address set, the third physical address set includes M physical addresses, the M physical addresses are in a one-to-one correspondence with M logical addresses included in the second logical address set, the third physical address set is used to store the second data, and M is an integer greater than or equal to 3.

The third physical address set may include at least three discrete physical addresses. Specifically, the storage chip may divide the second logical address set into a quantity of (for example, M) logical addresses based on a quantity of (for example, M) physical addresses included in the third physical address set. It may be understood that one physical address corresponds to one logical address. Therefore, the third indication information includes the third physical address set and the second logical address set that have a mapping relationship.

804. The storage chip sends a second response message for the second request to the host chip, where the second response message includes the third indication information, and the second response message is used to indicate to update the mapping relationship between a logical address and a physical address in the host chip.

Further, the second response message further includes third control information.

The third control information includes a fifth field, and the fifth field is used to indicate M.

Moreover, the third control information further includes a sixth field. The sixth field is used to indicate an access granularity of each physical address in the third physical address set; or the sixth field is used to indicate an access granularity of each logical address in the second logical address set; or the sixth field is used to indicate a sum of an access granularity of each physical address in the third physical address set and an access granularity of each logical address in the second logical address set, where the access granularity of each physical address in the third physical address set is the same as the access granularity of each logical address in the second logical address set.

It may be understood that, for a specific description of the access granularity, refer to the implementation shown in FIG. 7. Details are not described herein again.

805. The host chip receives the second response message from the storage chip, and updates the mapping relationship between a logical address and a physical address based on the third indication information in the second response message.

For example, the mapping relationship between a logical address and a physical address may be stored in DDR space. After receiving the second response message, the host chip may obtain an updated mapping relationship from a UPIU through parsing, to synchronously update the mapping relationship between a logical address and a physical address in the DDR space of the host chip with the updated mapping relationship.

It may be understood that the second indication information may be carried in the EHS extended domain, and the second control information may be carried in the second reserved field in the UPIU protocol frame.

In this embodiment of this application, when a large quantity of mapping relationships are updated in the storage chip, the storage chip can indicate an updated mapping relationship to the host chip in time, thereby improving real-time information exchange efficiency.

It may be understood that the methods in the foregoing embodiments focus differently. For an implementation that is not described in detail in one of the embodiments, refer to the other embodiment. Details are not described herein again.

It may be understood that the first indication information, the second indication information, and the third indication information shown in FIG. 7 and FIG. 8 may be carried in the EHS extended domain shown in FIG. 6. More specifically, the first indication information may be carried in an EHS extended domain that carries a UPIU request, and the second indication information and the third indication information may be carried in an EHS extended domain that carries a UPIU response.

To better understand the methods provided in the embodiments of this application, the following describes the methods with reference to specific scenarios.

FIG. 9a is a schematic structural diagram of an EHS extended domain according to an embodiment of this application. The EHS extended domain may be used to carry first indication information.

As shown in FIG. 9a, a reference numeral 32 is the EHS extended domain provided in this embodiment of this application, and may be used to carry the first indication information. Further, one or more of a reference numeral 5, a reference numeral 6, or a reference numeral 7 may be a first reserved field in a UPIU protocol frame. In an example of the reference numeral 5, the reference numeral 5 may be used to carry an access granularity, and a reference numeral 8 may be used to carry a quantity. To be specific, the reference numeral 5 is a second field provided in this embodiment of this application, and the reference numeral 5 may be used to carry an access granularity of each physical address in a first physical address set, or an access granularity of each logical address in a first logical address set, or a sum of an access granularity of each physical address in a first physical address set and an access granularity of each logical address in a first logical address set. The reference numeral 8 is a first field provided in this embodiment of this application, and the reference numeral 8 may be used to carry a quantity N. The reference numeral 32 may be used to carry the first logical address set and the first physical address set in this embodiment of this application. This is shown in FIG. 9a.

It may be understood that content indicated or carried by another field or reference numeral in the UPIU protocol frame shown in FIG. 9a is not limited in this embodiment of this application.

FIG. 9b is a schematic structural diagram of another EHS extended domain according to an embodiment of this application. The EHS extended domain may be used to carry second indication information or third indication information.

As shown in FIG. 9b, a reference numeral 32 is the EHS extended domain provided in this embodiment of this application, and may be used to carry the second indication information or the third indication information. Further, one or more of a reference numeral 5 or a reference numeral 6 may be a second reserved field or a third reserved field in a UPIU protocol frame. In an example in which the EHS extended domain carries the second indication information, and the reference numeral 5 is the second reserved field in the UPIU protocol frame, the reference numeral 5 may be used to carry an access granularity, and a reference numeral 8 may be used to carry a quantity. To be specific, the reference numeral 5 is a fourth field in this embodiment of this application, and the reference numeral 5 may be used to carry an access granularity of each physical address in a second physical address set in this embodiment of this application, or an access granularity of each logical address in a first logical address set, or a sum of an access granularity of each physical address in a second physical address set and an access granularity of each logical address in a first logical address set. In another example in which the EHS extended domain carries the third indication information, and the reference numeral 5 is the third reserved field in the UPIU protocol frame, the reference numeral 5 is a sixth field in this embodiment of this application, and the reference number 5 may be used to carry an access granularity of each physical address in a third physical address set in this embodiment of this application, or an access granularity of each logical address in a second logical address set, or a sum of an access granularity of each physical address in a third physical address set and an access granularity of each logical address in a second logical address set.

The reference numeral 8 is a third field or a fifth field in this embodiment of this application, and the reference numeral 8 may be used to carry N or M.

The reference numeral 32 may be used to carry the second indication information or the third indication information. That is, the reference number 32 may be used to carry the first logical address set and the second physical address set that have a mapping relationship, or may be used to carry the second logical address set and the third physical address set that have a mapping relationship. This is shown in FIG. 9b.

It may be understood that content indicated or carried by another field or label in the UPIU protocol frame is not limited in this embodiment of this application.

The foregoing describes in detail the methods in the embodiments of this application. The following provides apparatuses in the embodiments of this application.

Figure 10:
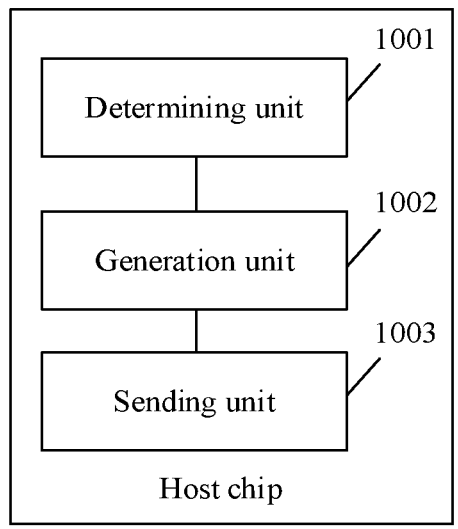
FIG. 10 is a schematic structural diagram of another host chip according to an embodiment of this application.

FIG. 10 is a schematic structural diagram of a host chip according to an embodiment of this application. The host chip may be configured to perform the methods shown in FIG. 6 to FIG. 8. As shown in FIG. 10, the host chip includes:

a determining unit 1001, configured to determine a first logical address set;

a generation unit 1002, configured to generate first indication information, where the first indication information includes the first logical address set and a first physical address set that is determined based on a mapping relationship between a logical address and a physical address and that corresponds to the first logical address set, the first physical address set includes N physical addresses, the N physical addresses are in a one-to-one correspondence with N logical addresses included in the first logical address set, and N is an integer greater than or equal to 2; and a sending unit 1003, configured to send a first request to a storage chip connected to the host chip, where the first request includes the first indication information.

It may be understood that the host CPU shown in FIG. 2 may be configured to perform the implementations performed by the determining unit 1001 and the generation unit 1002. In addition, In one embodiment, the host CPU may be further configured to control the UFS host controller to perform the implementation performed by the sending unit 1003.

In this embodiment of this application, the mapping relationship between a logical address and a physical address is stored in the host chip with relatively large space, so that a response speed of a read request can be effectively increased. In addition, the first indication information is generated, the first indication information may be used to indicate the first physical address set, and the first physical address set includes at least two physical addresses, so as to implement an 8 KB, 16 KB, or even 32 KB read request, thereby effectively implementing efficiency of real-time information exchange between the host chip and the storage chip.

Specifically, the first request further includes first control information, the first control information includes a first field, and the first field is used to indicate N.

Specifically, the first control information further includes a second field; and the second field is used to indicate an access granularity of each physical address in the first physical address set; or the second field is used to indicate an access granularity of each logical address in the first logical address set; or the second field is used to indicate a sum of an access granularity of each physical address in the first physical address set and an access granularity of each logical address in the first logical address set, where the access granularity of each physical address in the first physical address set is the same as the access granularity of each logical address in the first logical address set.

Figure 11:
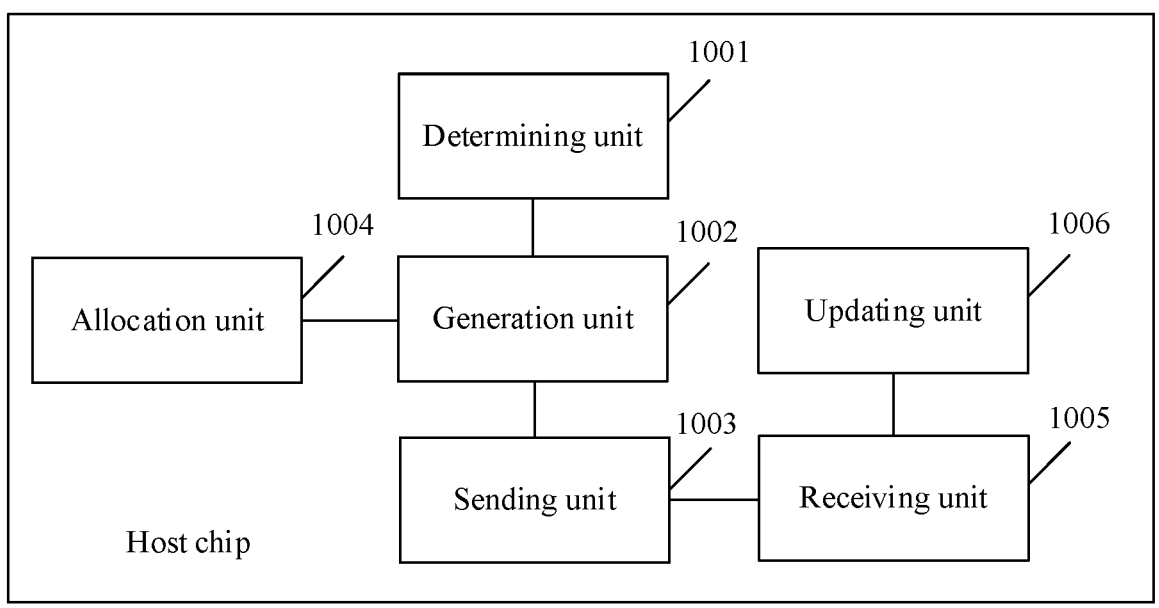
FIG. 11 is a schematic structural diagram of still another host chip according to an embodiment of this application.

Specifically, as shown in FIG. 11, the host chip further includes:

an allocation unit 1004, configured to allocate an extension header field EHS extended domain, where the EHS extended domain is used to carry the first indication information.

Specifically, the first control information is carried in a first reserved field in a UPIU protocol frame.

In one embodiment, as shown in FIG. 11, the host chip further includes:

a receiving unit 1005, configured to receive a first response message from the storage chip, where the first response message includes second indication information, the second indication information includes the first logical address set and a second physical address set, the second physical address set is a physical address set that corresponds to the first logical address set after the mapping relationship between a logical address and a physical address is updated, the second physical address set includes N physical addresses, and the N physical addresses are in a one-to-one correspondence with the N logical addresses.

Specifically, the first response message further includes second control information, the second control information includes a third field, and the third field is used to indicate N.

Specifically, the second control information further includes a fourth field; and the fourth field is used to indicate an access granularity of each physical address in the second physical address set; or the fourth field is used to indicate an access granularity of each logical address in the first logical address set; or the fourth field is used to indicate a sum of an access granularity of each physical address in the second physical address set and an access granularity of each logical address in the first logical address set, where the access granularity of each physical address in the second physical address set is the same as the access granularity of each logical address in the first logical address set.

Specifically, the second indication information may be carried in the EHS extended domain, and the second control information may be carried in a second reserved field in the UPIU protocol frame.

In one embodiment, the sending unit 1003 is further configured to send a second request to the storage chip, where the second request includes a second logical address set and second data, and the second data includes data to be written into the storage chip.

Specifically, the second request may be used to request to write the second data into the storage chip.

In one embodiment, the receiving unit 1005 may be further configured to receive a second response message from the storage chip connected to the host chip, where the second response message includes third indication information, the third indication information includes the second logical address set and a third physical address set corresponding to the second logical address set, the third physical address set includes M physical addresses, the M physical addresses are in a one-to-one correspondence with M logical addresses included in the second logical address set, the third physical address set is used to store the second data, and M is an integer greater than or equal to 3.

As shown in FIG. 11, the host chip further includes:

an update unit 1006, configured to update the mapping relationship between a logical address and a physical address in the host chip based on the third indication information.

Specifically, the second response message further includes third control information, the third control information includes a fifth field, and the fifth field is used to indicate M.

Specifically, the third control information further includes a sixth field; and the sixth field is used to indicate an access granularity of each physical address in the third physical address set; or the sixth field is used to indicate an access granularity of each logical address in the second logical address set; or the sixth field is used to indicate a sum of an access granularity of each physical address in the third physical address set and an access granularity of each logical address in the second logical address set, where the access granularity of each physical address in the third physical address set is the same as the access granularity of each logical address in the second logical address set.

Specifically, the third indication information may be carried in the EHS extended domain, and the third control information may be carried in a third reserved field in the UPIU protocol frame.

Specifically, the host CPU shown in FIG. 2 may be further configured to perform the implementation performed by in updating unit 1006, and the like. In addition, In one embodiment, the host CPU may be further configured to control the UFS host controller to perform the implementation performed by the receiving unit 1005, and the like. This is not limited in this embodiment of this application.

It may be understood that, for specific implementations of the host chip shown in FIG. 10 and FIG. 11, refer to the specific implementations in the foregoing embodiments. Details are not described herein again.

Figure 12:
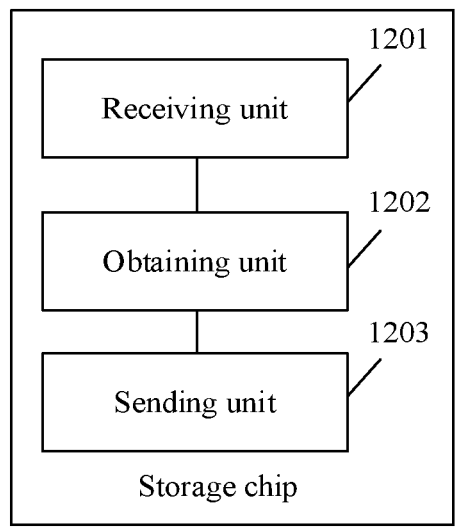
FIG. 12 is a schematic structural diagram of another storage chip according to an embodiment of this application.

FIG. 12 is a schematic structural diagram of a storage chip according to an embodiment of this application. The storage chip may be configured to perform the methods shown in FIG. 6 to FIG. 8. As shown in FIG. 12, the storage chip includes:

a receiving unit 1201, configured to receive a first request from a host chip connected to the storage chip, where the first request includes first indication information, the first indication information includes a first logical address set and a first physical address set that is determined based on a mapping relationship between a logical address and a physical address and that corresponds to the first logical address set, the first physical address set includes N physical addresses, the N physical addresses are in a one-to-one correspondence with N logical addresses included in the first logical address set, and N is an integer greater than or equal to 2;

an obtaining unit 1202, configured to obtain first data based on the first physical address set, where the first data includes data stored in the first physical address set; and a sending unit 1203, configured to send the first data to the host chip.

It may be understood that the controller in the storage chip shown in FIG. 3 may be configured to perform the method performed by the obtaining unit 1202, and the external serial interface (not shown in FIG. 3) and the like in the storage chip may be configured to perform the methods performed by the receiving unit 1201 and the sending unit 1203.

Specifically, the first request further includes first control information, the first control information includes a first field, and the first field is used to indicate N.

Specifically, the first control information further includes a second field; and the second field is used to indicate an access granularity of each physical address in the first physical address set; or the second field is used to indicate an access granularity of each logical address in the first logical address set; or the second field is used to indicate a sum of an access granularity of each physical address in the first physical address set and an access granularity of each logical address in the first logical address set, where the access granularity of each physical address in the first physical address set is the same as the access granularity of each logical address in the first logical address set.

Specifically, the first indication information may be carried in an extension header field EHS extended domain, and the EHS extended domain is allocated by the host chip. In addition, the first control information may be carried in a first reserved field in a UPIU protocol frame.

In one embodiment, the sending unit 1203 is further configured to: when it is determined that the mapping relationship between a logical address and a physical address changes, send a first response message to the host chip, where the first response message includes second indication information, the second indication information includes the first logical address set and a second physical address set, the second physical address set is a physical address set that corresponds to the first logical address set after the mapping relationship between a logical address and a physical address is updated, the second physical address set includes N physical addresses, and the N physical addresses are in a one-to-one correspondence with the N logical addresses.

Specifically, the first response message further includes second control information, the second control information includes a third field, and the third field is used to indicate N.

Specifically, the second control information further includes a fourth field; and the fourth field is used to indicate an access granularity of each physical address in the second physical address set; or the fourth field is used to indicate an access granularity of each logical address in the first logical address set; or the fourth field is used to indicate a sum of an access granularity of each physical address in the second physical address set and an access granularity of each logical address in the first logical address set, where the access granularity of each physical address in the second physical address set is the same as the access granularity of each logical address in the first logical address set.

In one embodiment, the receiving unit 1201 is further configured to receive a second request from the host chip connected to the storage chip, where the second request includes a second logical address set and second data, and the second data includes data to be written into the storage chip.

Figure 13:
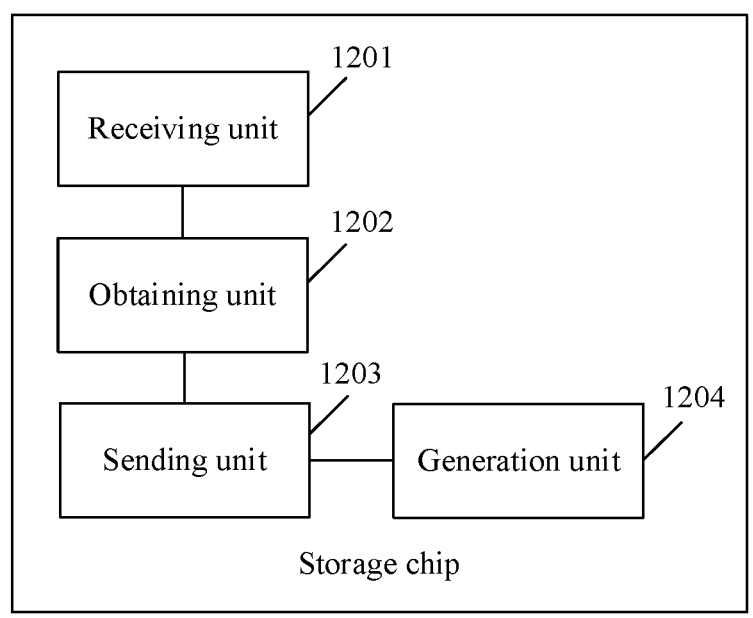
FIG. 13 is a schematic structural diagram of still another storage chip according to an embodiment of this application.

As shown in FIG. 13, the storage chip further includes:

a generation unit 1204, configured to: after the second data is written into the storage chip, generate third indication information based on a changed mapping relationship between a logical address and a physical address, where the third indication information includes the second logical address set and a third physical address set corresponding to the second logical address set, the third physical address set includes M physical addresses, the M physical addresses are in a one-to-one correspondence with M logical addresses included in the second logical address set, the third physical address set is used to store the second data, and M is an integer greater than or equal to 3.

The sending unit 1203 is configured to send a second response message for the second request to the host chip, where the second response message includes the third indication information, and the second response message is used to indicate to update the mapping relationship between a logical address and a physical address in the host chip.

Specifically, the second response message further includes third control information, the third control information includes a fifth field, and the fifth field is used to indicate M.

Specifically, the third control information further includes a sixth field; and the sixth field is used to indicate an access granularity of each physical address in the third physical address set; or the sixth field is used to indicate an access granularity of each logical address in the second logical address set; or the sixth field is used to indicate a sum of an access granularity of each physical address in the third physical address set and an access granularity of each logical address in the second logical address set, where the access granularity of each physical address in the third physical address set is the same as the access granularity of each logical address in the second logical address set.

Specifically, the third indication information may also be carried in the EHS extended domain. In addition, the third control information may be carried in a third reserved field in the UPIU protocol frame.

It may be understood that, for specific implementations of the storage chip shown in FIG. 12 and FIG. 13, refer to the specific implementations in the foregoing embodiments. Details are not described herein again.

A person of ordinary skill in the art may understand that all or some of the procedures of the methods in the embodiments may be implemented by a computer program instructing relevant hardware. The program may be stored in a computer-readable storage medium. When the program is executed, the procedures of the methods in the embodiments may be performed. The foregoing storage medium includes any medium that can store program code, such as a ROM, a random access memory RAM, a magnetic disk, or an optical disc.

What is claimed is:

1. An information processing method, comprising:
    determining, by a host chip, a first logical address set, wherein the host chip communicates with a storage chip through a universal flash storage protocol information unit (UPIU);
    generating, by the host chip, first indication information comprising the first logical address set and a first physical address set, wherein the first physical address set is determined based on a mapping relationship between a logical address and a physical address in the storage chip and corresponds to the first logical address set, wherein the first physical address set comprises N physical addresses respectively corresponding to N logical addresses comprised in the first logical address set, and wherein N is an integer greater than or equal to 2; and
    sending, by the host chip, a first request to the storage chip, wherein the first request comprises the first indication information, wherein the first request further comprises first control information, wherein the first control information comprises a first field, and wherein the first field is to indicate the number of N, and wherein the first control information further comprises a second field to indicate at least one of
        an access granularity of each physical address in the first physical address set or
        an access granularity of each logical address in the first logical address set or
        a sum of an access granularity of each physical address in the first physical address set and an access granularity of each logical address in the first logical address set, wherein the access granularity of each physical address in the first physical address set is the same as the access granularity of each logical address in the first logical address set.

2. The method according to claim 1, wherein before the sending, by the host chip, a first request to a storage chip connected to the host chip, the method further comprises:
    allocating, by the host chip, an extension header field (EHS) extended domain, wherein the EHS extended domain is to carry the first indication information.

3. The method according to claim 1, wherein the first control information is carried in a first reserved field in a UPIU protocol frame.

4. The method according to claim 3, wherein after the sending, by the host chip, a first request to a storage chip connected to the host chip, the method further comprises:
    receiving, by the host chip, a first response message from the storage chip, in response to the first request, wherein
    the first response message comprises second indication information comprising the first logical address set and a second physical address set, wherein the second physical address set is a physical address set that corresponds to the first logical address set after the mapping relationship between a logical address and a physical address is updated, wherein the second physical address set comprises N physical addresses corresponding to the N logical addresses respectively.

5. The method according to claim 4, wherein the first response message further comprises second control information, wherein the second control information comprises a third field, and wherein the third field is to indicate the number of N.

6. The method according to claim 5, wherein the second control information further comprises a fourth field to indicate at least one of
    an access granularity of each physical address in the second physical address set; or
    an access granularity of each logical address in the first logical address set; or
    a sum of an access granularity of each physical address in the second physical address set and an access granularity of each logical address in the first logical address set, wherein the access granularity of each physical address in the second physical address set is the same as the access granularity of each logical address in the first logical address set.

7. The method according to claim 5, wherein the second control information is carried in a second reserved field in the UPIU protocol frame.

8. The method according to claim 4, wherein the second indication information is carried in the EHS extended domain.

9. A host chip capable of communicating with a storage chip through a universal flash storage protocol information unit (UPIU), comprising:
    a processor, and a communications interface coupled to the processor; wherein the processor is configured to:
        determine a first logical address set;
        generate first indication information comprising the first logical address set and a first physical address set that is determined based on a mapping relationship between a logical address and a physical address and that corresponds to the first logical address set, wherein the first physical address set comprises N physical addresses respectively corresponding to with N logical addresses comprised in the first logical address set, and wherein N is an integer greater than or equal to 2; and
        send a first request to the storage chip through the communications interface, wherein the first request comprises the first indication information wherein the first request further comprises first control information, wherein the first control information comprises a first field, and wherein the first field is to indicate the number of N, and wherein the first control information further comprises a second field to indicate at least one of
            an access granularity of each physical address in the first physical address set; or an access granularity of each logical address in the first logical address set; or a sum of an access granularity of each physical address in the first physical address set and an access granularity of each logical address in the first logical address set, wherein the access granularity of each physical address in the first physical address set is the same as the access granularity of each logical address in the first logical address set.

10. The host chip according to claim 9, wherein the processor is further configured to allocate an extension header field EHS extended domain, wherein the EHS extended domain is to carry the first indication information.

11. The method according to claim 9, wherein the first control information is carried in a first reserved field in a UPIU protocol frame.

12. The host chip according to claim 11, wherein the processor is further configured to receive a first response message from the storage chip in response to the first request, wherein the first response message comprises second indication information comprising the first logical address set and a second physical address set, wherein the second physical address set is a physical address set that corresponds to the first logical address set after the mapping relationship between a logical address and a physical address is updated, wherein the second physical address set comprises N physical addresses corresponding to the N logical addresses respectively.

13. A storage chip capable of communicating with a host chip through a universal flash storage protocol information unit (UPIU), comprising:

a controller and a cache array coupled to the controller; wherein the controller is configured to:

receive a first request from the host chip, wherein the first request comprises first indication information comprising a first logical address set and a first physical address set that is determined based on a mapping relationship between a logical address and a physical address in the cache array and that corresponds to the first logical address set, wherein the first physical address set comprises N physical addresses respectively corresponding to N logical addresses comprised in the first logical address set, and wherein N is an integer greater than or equal to 2;

obtain first data from the cache array based on the first physical address set, wherein the first data comprises data stored in the first physical address set; and send the first data to the host chip;

receive a second request from the host chip, wherein the second request comprises a second logical address set and second data, and the second data comprises data to be written into the storage chip;

after the second data is written into the cache array, generate third indication information based on a changed mapping relationship between a logical address and a physical address;

send a second response message for the second request to the host chip, wherein the second response message comprises the third indication information, and wherein the second response message is to indicate to update the mapping relationship between a logical address and a physical address in the host chip, wherein the second response message further comprises third control information, and wherein the third control information comprises a fifth field, and wherein the fifth field is used to indicate the number of M, and wherein the third control information further comprises a sixth field to indicate at least one of an access granularity of each physical address in a third physical address set or an access granularity of each logical address in the second logical address set or a sum of an access granularity of each physical address in the third physical address set and an access granularity of each logical address in the second logical address set, wherein the access granularity of each physical address in the third physical address set is the same as the access granularity of each logical address in the second logical address set.

14. The storage chip according to claim 13, wherein the third indication information comprises the second logical address set and the third physical address set corresponding to the second logical address set, wherein the third physical address set comprises M physical addresses respectively corresponding to M logical addresses comprised in the second logical address set, wherein the third physical address set is to store the second data, and wherein M is an integer greater than or equal to 3.

\* \* \* \* \*

UNITED STATES PATENT AND TRADEMARK OFFICE
CERTIFICATE OF CORRECTION

PATENT NO. : 11,467,766 B2
APPLICATION NO. : 17/162232
DATED : October 11, 2022
INVENTOR(S) : Long Jin It is certified that error appears in the above-identified patent and that said Letters Patent is hereby corrected as shown below:

In the Claims

Claim 1, Column 35, Line 49, delete "first physical address set or" and insert --first physical address set; or--.

Claim 1, Column 35, Line 51, delete "logical address set or" and insert --logical address set; or--.

Claim 9, Column 36, Lines 59-60, delete "information wherein" and insert --information, wherein--.

Claim 13, Column 38, Line 27, delete "physical address set or" and insert --physical address set; or--.

Claim 13, Column 38, Line 29, delete "second logical address set or" and insert --second logical address set; or--.

Signed and Sealed this
Tenth Day of January, 2023

Katherine Kelly Vidal
*Director of the United States Patent and Trademark Office*